United States Patent [19]

Lee et al.

[11] Patent Number: 5,040,229

[45] Date of Patent: Aug. 13, 1991

[54] CONTOUR FEATURE-BASED METHOD FOR IDENTIFICATION AND SEGMENTATION OF TOUCHING CHARACTERS

[75] Inventors: Yongchun Lee, Rochester; Andrew M. Assad, N. Chili, both of N.Y.

[73] Assignee: Eastman Kodak Company, Rochester, N.Y.

[21] Appl. No.: 474,188

[22] Filed: Feb. 2, 1990

[51] Int. Cl.[5] .............................................. G06K 9/34
[52] U.S. Cl. ....................................................... 382/9
[58] Field of Search ............................................ 382/9

[56] References Cited

U.S. PATENT DOCUMENTS

| | | | |
|---|---|---|---|
| 4,045,773 | 8/1977 | Kadota et al. | 382/9 |
| 4,365,234 | 12/1982 | Henrichon, Jr. | 382/9 |
| 4,527,283 | 7/1985 | Ito et al. | 382/9 |
| 4,562,594 | 12/1985 | Bednar et al. | 382/9 |
| 4,635,290 | 1/1977 | Tsuji et al. | 382/9 |
| 4,731,857 | 3/1988 | Tappert | 382/9 |
| 4,764,971 | 8/1988 | Sullivan | 382/9 |
| 4,769,849 | 9/1988 | Alsing | 382/9 |

OTHER PUBLICATIONS

Yokoi et al., "An Analysis of Topological Properties of Digitized Binary Pictures Using Local Features", *Computer Graphics and Image Processing*, vol. 4, pp. 63-73 (1975).

Sklansky et al., "Fast Polygonal Approximation of Digitized Curves", *Pattern Recognition*, vol. 12, pp. 327-331 (Pergamon Press, Great Britain 1980).

Jimenez et al., "Some Experiments in Image Vectorization", *IBM Journal of Research Development*, vol. 26, No. 6, pp. 724-734 (Nov. 1982).

Primary Examiner—Leo H. Boudreau
Assistant Examiner—Rohini Khanna
Attorney, Agent, or Firm—Dennis R. Arndt

[57] ABSTRACT

Characters which touch one another in a document image are identified and separated in accordance with their contours. The objects in the image are divided into two classes comprising, respectively, those having closed inner contours and those which do not. An object in the first class having either a closed inner contour which is not centered in the object or two horizontally offset closed inner contours or more than two closed inner contours is identified as containing two touching characters and is split in accordance with the character stroke thickness observed in the document. An object in the second class whose contours intersect three spaced horizontal reference lines at more than a predetermined number of points is compared against intersection patterns characteristic of single characters. If a match is not found, the object is identified as containing touching characters.

11 Claims, 4 Drawing Sheets ru  FIG. 10

CONTOUR FEATURE-BASED METHOD FOR IDENTIFICATION AND SEGMENTATION OF TOUCHING CHARACTERS

BACKGROUND OF THE INVENTION

1. Technical Field

A portion of the disclosure of this patent documents contains material which is subject to copyright protection. The copyright owner has no objection to the facsimile reproduction by anyone of the patent document or the patent disclosure, as it appears in the Patent and Trademark office patent file or records, but otherwise reserves all copyright rights whatsoever.

The invention is related to optical character recognition systems and in particular to optical character recognition pre-processors for separating the images of touching characters in a document image.

2. Background Art

In optical character recognition systems, a document is scanned to create a digital image. The digital document image is then processed so as to separate each character in the document and to recognize each character as a particular symbol. Typically, the characters in the document image are separated into individual character images by searching for empty columns between adjacent characters. However, if a pair of adjacent characters is kerned (so that the characters are overlying or partially wrapped around one another), there are no empty columns between the characters. This problem is solved by using connected component analysis to discern and separate the individual unconnected objects comprising the two characters. A more severe problem arises, however, when two adjacent characters in the document actually touch one another, due to a printing error or poor document reproduction, for example. In such a case, the objects comprising the two adjacent characters are actually connected together, thus forming a single object which cannot be readily separated by typical segmentation techniques such as connected component analysis. Failure to separate adjacent characters in the document prevents the optical character recognition system from recognizing the characters. Thus, it is imperative that a preprocessor be provided in an optical character recognition system to separate touching characters.

Various pre-processing techniques for optical character recognition systems and other types of systems are known. For example, U.S. Pat. No. 4,769,849 uses the outer contour features of each segment in the document image to identify all the pixels in a given object but not to separate touching characters in the same object. U.S. Pat. No. 4,764,971 uses image features such as variance or contrast to identify and segment different objects in an image, but does not teach separating touching characters in the same object. U.S. Pat. No. 4,731,857 discloses a method for segmenting characters in a document image, but not using their contour features.

In summary, there is a need for a reliable, fast and simple pre-processor for separating touching characters in a document image for an optical character recognition system. Accordingly, it is an object of the invention to provide a simple, reliable and fast touching character separating pre-processor in an optical character recognition system.

It is a further object of the invention to provide a method for separating touching characters in a document image using simple contour-following steps to detect and separate touching characters having closed inner contours.

It is a yet further object of the invention to provide a method for detecting touching characters in a document image using simple line-intersection steps for characters which do not have closed inner contours.

DISCLOSURE OF THE INVENTION

Characters which touch one another in a document image are identified and separated in accordance with their contours. The objects in the image are divided into two classes comprising, respectively, those having closed inner contours (such as a letter "D" or "B", for example) and those which do not (such as a letter "E" or "T", for example). An object in the first class having either a closed inner contour which is not centered in the object or two horizontally offset closed inner contours or more than two closed inner contours is identified as containing two touching characters and is split in accordance with the character stroke thickness observed in the document. An object in the second class whose contours intersect three spaced horizontal reference lines at more than a predetermined number of points is compared against intersection patterns characteristic of single characters. If a match is not found, the object is identified as containing touching characters. In this case, the touching characters are separated using more complex and slower processes which are not part of the invention. The advantage is that the invention obviates the need to use the slower more complex touching character separation processes except in those cases where they are absolutely necessary, thus minimizing the effect such slower processes have on overall system speed and performance.

The invention can be used in any type of optical character recognition system, either as a pre-processor or a post-processor. For example, the invention can be used as a post-processor in an optical character recognition system employing a neural network trained to recognize character images. In this particular application of the invention, segmented character images are fed to the input of a neural network which attempts to correlate each character image with a symbol. If the neural network's reliability score associated with its symbol choice is too low, or if the character image itself is particularly wide, the assumption is made that there are two touching characters in the character image and the character image is sent to a touching character separation processor embodying the invention. If the touching character separation processor succeeds in separating the character image into two individual characters using the contour feature-based methods of the invention discussed above, the two separated images are individually fed back to the input of the neural network. If the touching character separation processor identifies the character image as containing two touching characters in accordance with the line-intersection methods of the invention discussed above, but cannot separate them because of a lack of closed inner contours in the character image, the character image is sent to a downstream touching character separation processor which is more complex and slower than the one embodying the invention. The separated character images of the downstream touching character separator are fed back to the input of the neural network.

The touching character separation processor of the invention is useful in all other types of optical character recognition systems, in addition to the exemplary application mentioned here.

BRIEF DESCRIPTION OF THE DRAWINGS

The invention is described below in detail by reference to the accompanying drawings, of which:

FIGS. 10, 11 and 12 are other examples of touching characters analyzed in accordance with the aspect of the invention illustrated in FIGS. 8 and 9.

MODES FOR CARRYING OUT THE INVENTION

System Overview

Figure 1:
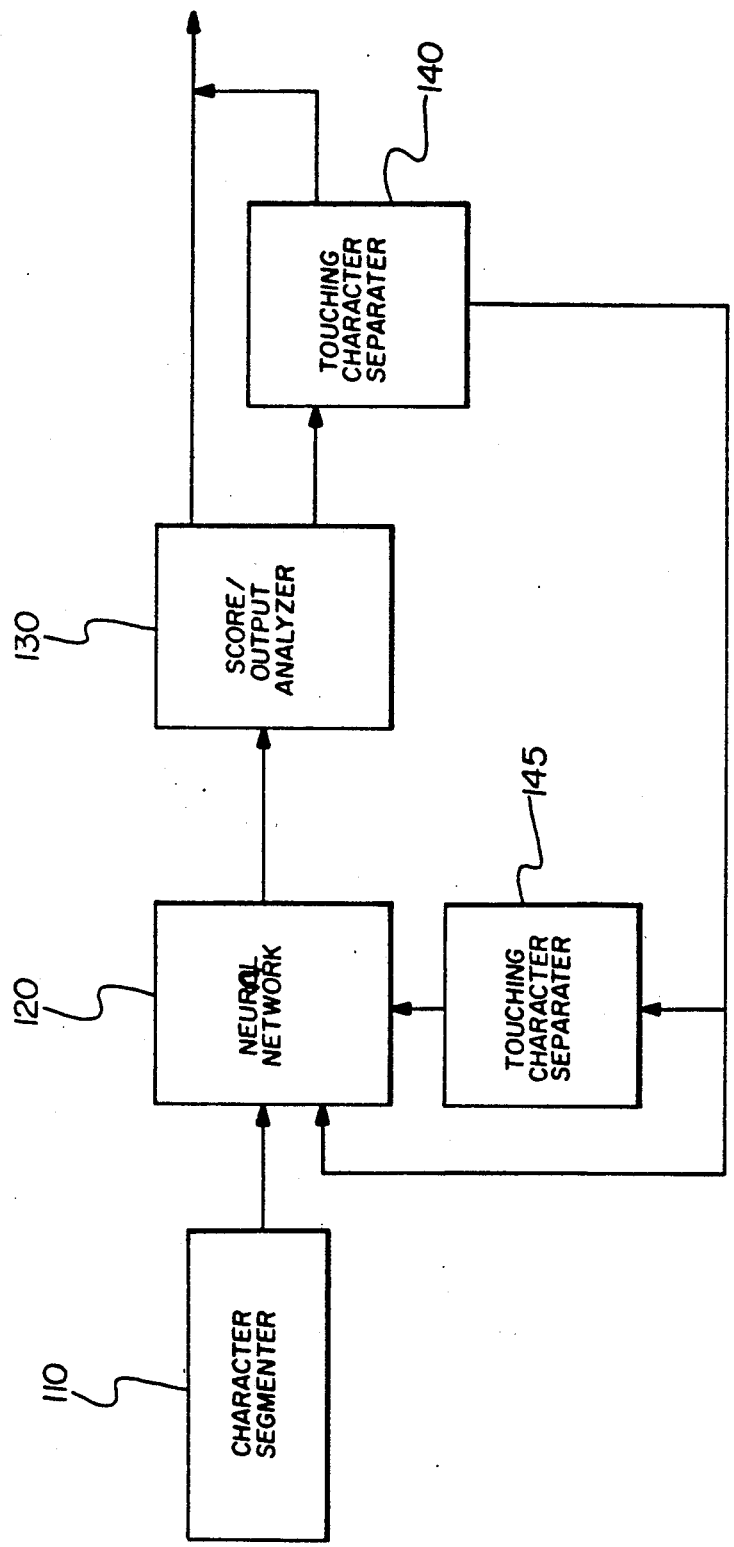
FIG. 1 is a simplified block diagram of one example of an optical character recognition system which employs a touching character separation processor embodying the invention.

FIG. 1 illustrates one of many possible types of optical character recognition systems in which the invention may be employed to great advantage. In the particular example of FIG. 1, the digitized binary image of a document is processed by a character segmenter 110 so as to separate the image of each individual character from the document. The segmenter 110 employs well-known techniques such as searching for empty vertical columns between adjacent characters in order to separate them. Or, the segmenter may employ more sophisticated dekerning techniques such as connected component analysis to separate the characters. Each individual character image thus segmented from the document image is sent to the input of a neural network 120 which has been trained to recognized the images of a set of symbols. Use of connected component analysis to separate adjacent character images for optical character recognition by a neural network is disclosed in U.S. patent application Ser. No. 474,587 filed Feb. 2, 1990 by Roger S. Gaborski et al. entitled "OPTICAL CHARACTER RECOGNITION NEURAL NETWORK SYSTEM FOR MACHINE-PRINTED CHARACTERS" and assigned to the present assignee. The neural network 120 transmits at its output the identification of a symbol for the character image received at the input of the neural network 120 and a score or correlation of the image of the selected symbol with the present character image. An analyzer 130 determines whether the neural network's score for the identified symbol is too low or whether the character image is particularly wide. If either the score generated by the neural network is too low or if the character image is too wide, it is likely that the character image actually contains two characters which are touching one another. The segmenter 110 is generally unable to separate touching characters. Therefore, the segmenter 130 passes along the present character image to a very fast touching character separation processor 140 embodying the invention. The touching character separation processor 140 attempts to separate the character image into two characters. If the attempt is successful, the two images resulting from the separation are fed back from the touching character separation processor 140 to the input of the neural network 120. If the touching character separation processor 140 determines that the character image contains only a single character, it does not disturb the symbol choice made by the neural network 120. If the attempt is unsuccessful, and if the touching character separation processor 140 has definitely detected the presence of touching characters in the character image, the touching character separation processor passes the present character image along to another more comprehensive, complex and slower touching character separator 145 which splits the character image into two separate images. Preferably, the downstream touching character separator 145 is sufficiently comprehensive that it will separate the touching characters into two images even though the faster touching character separation processor 140 cannot. The comprehensive and complex touching character separator 145 is disclosed in the above-referenced patent application by Roger S. Gaborski et al. and in particular with reference to FIG. 15 of that application.

FAST TOUCHING CHARACTER SEPARATION PROCESSOR

Figure 2:
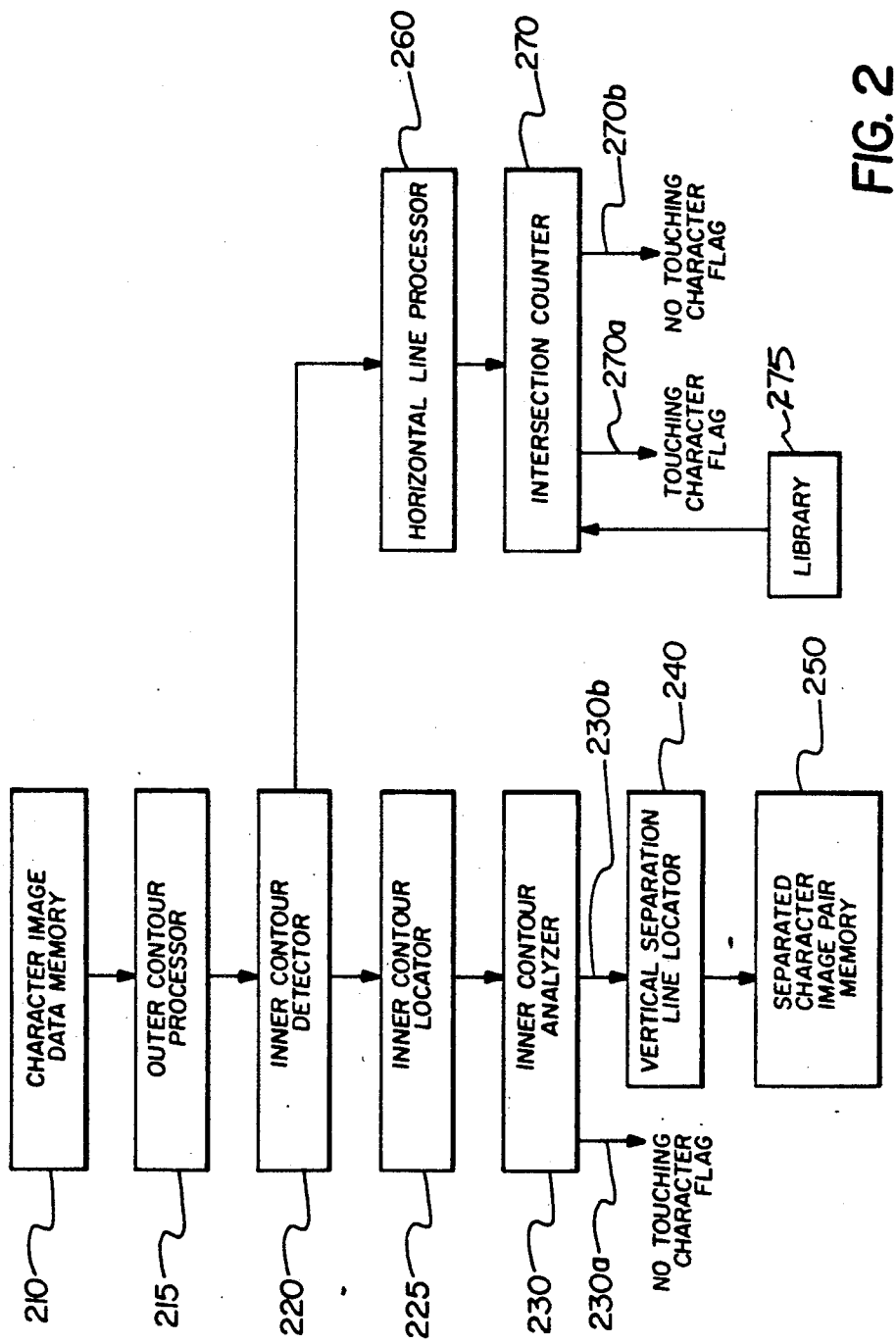
FIG. 2 is a block diagram of the touching character separation processor of the invention.

A touching character separation processor embodying the invention will now be described. Such a processor corresponds to the touching character separation processor 140 employed in the system of FIG. 1. Referring to FIG. 2, the touching character separation processor of the invention receives a character image at an input device such as a memory 210. An outer contour processor 215, using contour vectorization techniques well-known in the art, determines the outline of the outer contour of the object comprising contiguous "ON" pixels in the character image. This outline is simply a listing of the locations of the locations in the image forming the outline of the object. The contour vectorization techniques employed by the outer contour processor 215 are described in the following three publications: Yokoi et al., "An Analysis of Topological Properties of Digitized Binary Pictures Using Local Features," *Computer Graphics and Image Processing,* Volume 4, pages 63–73 (1975); Sklansky et al., "Fast Polygonal Approximation of Digitized Curves," *Pattern Recognition,* Volume 12, pages 327–331 (Pergamon Press Ltd., Great Britain 1980); and, Jimenez et al., "Some Experiments in Image Vectorization," *IBM*

*Journal of Research Development*, Volume 26, Number 6, pages 724-734 (November 1982), the disclosures of which are incorporated herein by reference. These contour vectorization techniques are sufficiently well-known that they need no further description herein. Next, an inner contour detector 220, using techniques well-known in the art, determines whether there are any "holes" or closed inner contours in the object of contiguous "ON" pixels outlined by the outer contour processor 215. If there is at least one closed inner contour in the object, then the image is passed along to an inner contour locator 225. The inner contour locator 225, using techniques well-known in the art, locates and outlines all closed inner contours inside the object outlined by the outer contour processor 215. The outlines of the inner contours are simply listings of pixel locations in the character image which outline the closed inner contours. An inner contour analyzer 230 then analyzes the inner contours in accordance with a set of rules for detecting a point of separation between touching characters within the same character image. A vertical separation line locator 240 separates the character image along a vertical line located at the point of separation found by the analyzer 230. The resulting pair of character images is sent to an output device such as a buffer memory 250. The techniques employed by the inner contour detector 220 and the inner contour locator 225 are the contour vectorization techniques described in the three publication referenced above and therefore need no further description herein.

Operation of the Inner Contour Analyzer

OPERATION OF THE INNER CONTOUR ANALYZER

The inner contour analyzer 230 tests the inner contours against a set of rules by performing the following process:

(I) If there is only a single closed inner contour, determine whether the location of the inner contour is horizontally offset from the horizontal center of the object by at least a predetermined amount;

(II) If there are only two closed inner contours, determine whether they are horizontally offset from one another;

(III) Determine whether there are more than two closed inner contours; and (IV) If any of the foregoing determinations is found to be true, locate a separation point for vertically splitting the character image as follows:

(a) If there are two or more horizontally offset closed inner contours, locate the separation point halfway between two adjacent closed inner contours;

(b) If there is only one closed inner contour, horizontally offset the separation point away from the contour towards the center of the outer contour by a distance equal to the horizontal displacement between the inner contour and the vertical wall of the outer contour which is closest to the inner contour.

In step IVb, any method other than the one described for offsetting the separation point from the inner contour edge by one character stroke thickness is suitable. For example, one could estimate the average character stroke thickness from all characters in the document.

Figure 3A:
FIGS. 3a and 3b depict a pair of touching characters and their contours, respectively, in which an inner contour is off-center to the left, illustrating one operating rule of the touching character processor of FIG. 2.
Figure 3B:
Figure 4A:
FIGS. 4a and 4b depict a pair of touching characters and their contours, respectively, in which an inner contour is off-center to the right, illustrating another operating rule of the touching character processor of FIG. 2.
Figure 4B:
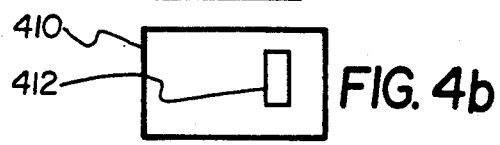

FIGS. 3a and 3b illustrate one example of the application of step I above in which the touching characters "O" and "C" (FIG. 3a) form an object with an outer contour 310 (FIG. 3b) having a single "hole" or closed inner contour 312 offset to the left from the center of the outer contour 310. A similar example is illustrated in FIGS. 4a and 4b in which the touching characters "E" and "A" (FIG. 4a) form an object 410 (FIG. 4a) having a single hole 412 offset to the right. In accordance with step IVb above, the object of FIG. 3b is split along a straight vertical line near the center of the outer contour 310. The same is true of the object of FIG. 4b.

Figure 5A:
FIGS. 5a and 5b depict a pair of touching characters and their contours, respectively, in which there are two horizontally adjacent inner contours, illustrating yet another operating rule of the touching character processor of FIG. 2.
Figure 5B:
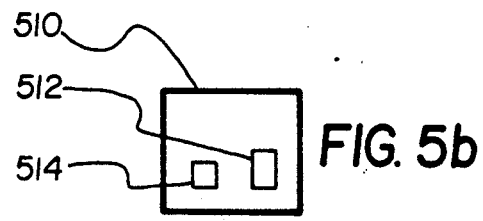
Figure 6A:
FIGS. 6a and 6b depict a pair of touching characters and their contours, respectively, in which there are two slightly offset inner contours, illustrating an operating rule of the touching character processor of FIG. 2.
Figure 6B:
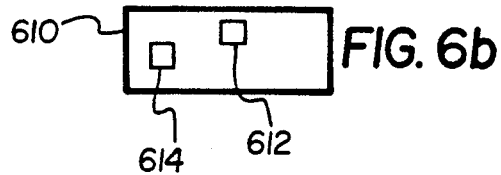

FIGS. 5a and 5b illustrate one example of the application of step II above in which the touching characters "a" and "b" form an object 510 having two horizontally offset holes 512 and 514. Similarly, the touching character sequence "a", "e", "c" of FIG. 6a form an object 610 of FIG. 6b having two horizontally offset holes 612 and 614. In accordance with step IVa above, the object of FIG. 6b is split along a straight vertical line halfway between the two holes 612 and 614. Interestingly, of the two split images thus formed, the split image containing the hole 614 still contains two touching characters, "e" and "c". In the system of FIG. 1, when fed back to the neural network such an image will result in a low neural network identification score and will be eventually fed to the touching character separator 140 again. This time, the contour analyzer 230 will find a case somewhat similar to that of FIG. 3b, and split the "e" from the "c".

Figure 7A:
FIGS. 7a and 7b depict a pair of touching characters and their contours, respectively, in which there are more than two inner contours, illustrating still another operating rule of the touching character processor of FIG. 2.
Figure 7B:
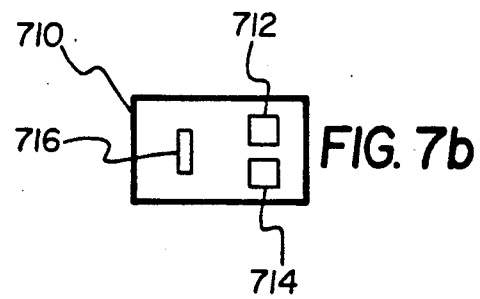

FIG. 7 illustrates one example of an application of step III above. The "A" and "B" of FIG. 7a forms an object with an outer contour 710 of FIG. 7a having three holes 712, 714 and 716. In accordance with step IVa above, the object is split halfway between the holes 714 and 716. There is no splitting between the holes 712 and 714 because these holes are not horizontally offset from one another.

Intersection Feature Extraction

INTERSECTION FEATURE EXTRACTION

Not all of the touching character images encountered by the inner contour detector 220 will have closed inner contours. For example, if the letters "t" and "y" are touching, there are no closed inner contours or holes. Such character images cause the inner contour detector 220 to declare an absence of closed inner contours and to pass along the character image to a horizontal line processor 260. The horizontal line processor 260, using well-known techniques, determines the height of the object of contiguous "ON" pixels in the image. It then superimposes three straight horizontal lines across the image at different heights which are, respectively, 25% of the object height, 50% of the object height and 75% of the object height. An intersection counter 270, using techniques well-known in the art, counts the number of intersections which each of the three superimposed horizontal lines makes with the edges of an object of contiguous "ON" pixels in the image.

The intersection counter 270 compares the number of intersections with a threshold. If the number exceeds the threshold, the intersection counter compares the intersection count pattern at the three horizontal lines with a library 275 of intersection count patterns of known single characters. If a match is not found, the intersection counter 270 transmits a "touching character flag" 270a. Otherwise, the intersection counter 270 transmits a "no touching character flag" 270b. The content of the library 275 is created by transmitting the solitary images of known characters to the input or memory 210 of the processor of FIG. 2 and storing in the library 275 the resulting intersection count generated by the intersection counter 270 for each of the three superimposed horizontal lines.

Figure 8:
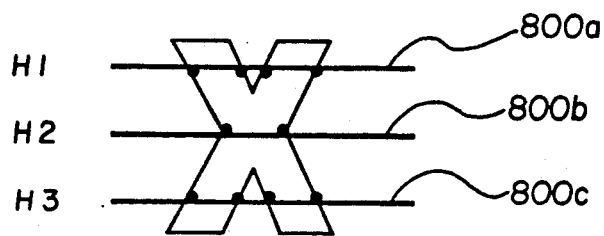
FIG. 8 is a diagram illustrating another aspect of the invention which counts the intersections with three horizontal lines superimposed on a character image to detect touching characters.
Figure 9:
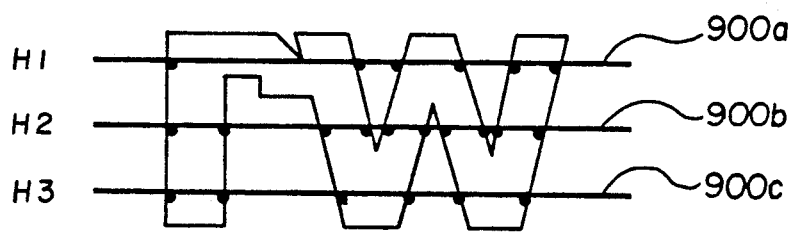
FIG. 9 is a diagram of another example in which three horizontal lines are superimposed on a character image in accordance with the invention.

FIG. 8 illustrates how the horizontal line processor 260 superimposes three horizontal lines 800a, b and c on the character image of a letter "X". In FIG. 8, the three horizontal lines are labelled H1, H2 and H3, respectively. Each intersection in FIG. 8 is indicated by a dot. There are four intersections with H1, two intersections with H2 and four intersections with H3. Therefore, the intersection count pattern computed by the intersection counter 270 for the character illustrated in FIG. 8 is 4-2-4. FIG. 9 shows three horizontal lines 900a, b, and c in the touching character pattern "rw". The count pattern is 6-10-6. Presumably, this count pattern would not match the intersection count pattern of any solitary character stored in the library 275. Therefore, the pattern "rw" would cause the intersection counter 270 to issue a touching character flag 270a. FIGS. 10, 11 and 12 illustrate the touching character pairs "ru", "Pu" and "th", respectively. These touching character pairs have the intersection count patterns 6-6-6, 2-4-6 and 4-6-6, respectively, which can be verified easily by the skilled worker.

The foregoing is indicative that one logical choice for a threshold against which to compare the intersection count is 6. Thus, if the intersection counter 270 determines that the number of intersections counted for any one of the three superimposed horizontal lines is 6 or greater, then the three-number sequence or pattern of intersection counts for the present character image is compared against the count patterns stored in the library 275. As long as a match is found, there are no touching characters in the image. Otherwise, a touching character flag 270a is transmitted.

In summary, the operation the intersection counter 270 is as follows:

(A) count the number of intersections along each superimposed horizontal line;

(B) determine whether the intersection count along any one of the superimposed horizontal lines exceeds a threshold;

(C) if the count exceeds the threshold, compare the intersection count pattern for all superimposed horizontal lines in the image with the library 275 of known patterns of single characters;

(D) if a match is not found in step C, transmit a touching character separation flag;

(E) if the determination in step B is that the count does not exceed the threshold or if a match is found in step D, transmit a NO touching character flag.

These steps may be varied as follows. First, the threshold may be decreased to as low as zero so that an intersection count pattern is always compared with the library 275. Secondly, another determination may be made that touching characters are present if the intersection count along any superimposed horizontal line exceeds a second larger threshold, such as 8 or 10, for example. In this variation, the touching character separation flag may be transmitted without resorting to the step of comparing the intersection count pattern with the library 275 of count patterns.

The attached appendices contain listings of computer programs with which the foregoing invention has been implemented. Appendix A and Appendix B are listings of pascal language computer programs which together implement the function of the outer contour processor 215 of FIG. 2. The program of Appendix A performs boundary tracing and the program of Appendix B performs linear approximations to obtain a final vectorized contour. Appendix C is a listing of pascal language computer program which implements the functions of the inner contour detector 220 and the inner contour locator 225 of FIG. 2. The program of Appendix C detects and locates closed inner contours with respect to their corresponding outer contours. Appendix D is a listing of a C language computer program which implements the functions of the inner contour analyzer 230, the vertical separation line locator 240, the library 275 and those functions of the intersection counter for steps B through E above. The program of Appendix D contains the rules for identifying touching characters for the two classes of characters, namely those with and those without closed inner contours. Appendix E is a listing of a C language computer program which implements the functions of the horizontal line processor 260 and the functions of the intersection counter 270 not implemented by the program of Appendix D. The program of Appendix E generates the three horizontal lines H1, H2 and H3 of FIG. 8 and counts the intersections of these lines with the contours of the characters.

INDUSTRIAL UTILITY

The invention is useful in optical character recognition systems as either a pre-processor or a post-processor which separates touching characters at very high speed.

While the invention has been described in detail by specific reference to preferred embodiments thereof, it is understood that variations and modifications may be made without departing from the true spirit and scope of the invention.

APPENDIX A

COPYRIGHT 1990 Eastman Kodak Company

```
program ptrace(input,output);

label 200;

type
    sl        = varying [70] of char;
    aty10     = array[1..10] of integer;
    byte      = 0..255;
```

```
    Nametype   = varying[60] of char;
    linetype   = packed array[1..1200] of byte;
    linetype1  = packed array[1..3,1..4500] of byte;

var
    bitmap              : packed array[0..4500,0..4500] of byte;
    buf                 : linetype;
    buf1                : linetype1;
    xp,yp               : array[1..3445] of integer;
    tablex,tabley       : array[1..8] of integer;
    c_buf,j,
    ih,iv,i,dx,dy,
    xs,ys,nc,
    tp,nbd,
    ly,lx,
    k,hsize,vsize,
    nline,line,
    nlabel,
    recordlength,
    k1                  : integer;
    xbuf,ybuf           : array[1..5] of integer;
    s,sa                : s1;
    filenumber,
    rimage,btst         : unsigned;
    bitv                : array[1..8] of unsigned;
    done                : boolean;
    f1                  : file of integer;

procedure LIB$INIT_TIMER;
    procedure LIB$SHOW_TIMER;
    Function ForFileReclen(Filename:Nametype):
                        integer;Fortran;
    Procedure ForOpenReadFile(Var FileNumber : Integer;
                        FileName: Nametype); Fortran;
    Procedure ForClosefile(Filenumber:integer); Fortran;
    Procedure ForReadOneRecord(Var FileNumber: integer;
                            ArrayRef: LineType;
                            ByteCount : integer;
                        Var Done :Boolean); Fortran;
    Procedure ForOpenWriteFile(Var FileNumber : integer;
                            FileName: Nametype;
                            RecordLength: integer); Fortran;
    Procedure ForWriteOneRecord(var FileNumber : integer;
                            ArrayRef :LineType;
                            ByteCount :integer); Fortran;

procedure pfollow(ih,iv :integer);
        label 1;

var
            ps,nstep,
        nc,
        ic,hw,
        vw,he,
        ve,cd           : integer;

begin
        ps :=0;
        tp :=1;
```

```
        xs   :=ih;
        ys   :=iv;
        cd   :=1;
        if bitmap[ih-1,iv]=0 then cd :=3;
        if bitmap[ih+1,iv]=0 then cd :=7;
        if bitmap[ih,iv-1]=0 then cd :=5;
        nstep :=1;
        bitmap[ih,iv] :=2;
1:      xp[tp] :=ih;
        yp[tp] :=iv;
        cd :=nstep+cd;
        for ic :=cd to cd+8 do begin
          nc :=ic;
          if nc>8 then nc :=nc-8;
            hw :=ih+tablex[nc];
            vw :=iv+tabley[nc];
            if bitmap[hw,vw]<>0 then
              begin
                 bitmap[hw,vw] :=2;
                 id :=nc+4;
                 if ps<>1 then begin
                                    ps :=1;
                                    he :=hw;
                                    ve :=bw;
                               end;
                 if cd>8 then cd :=cd-8;
                 ih :=hw;
                 iv :=bw;
                 tp :=tp+1;
                 if (ih<>xs) or (iv<>ys) then goto 1;
                 cd :=cd+nstep;
                 for ic :=cd to cd+8 do begin
                   nc :=ic;
                   if nc>8 then nc :=nc-8;
                     hw :=ih+tablex[nc];
                     bw :=iv+tabley[nc];
                     if bitmap[hw,bw]<>0 then
                     begin
                        cd :=cd-nstep;
                        if (hw<>he) or (bw<>ve) then goto 1;
                          xp[tp] :=ih;
                          yp[tp] :=iv;
                          exit;
                     end;
                 end;
              end;
        end;

begin bitv[1] :=1;
    bitv[2] :=2;
    bitv[3] :=4;
    bitv[4] :=8;
    bitv[5] :=16;
    bitv[6] :=32;
    bitv[7] :=64;
    bitv[8] :=128;
```

```
            writeln(' Enter input filename ---- ');
            readln(sa);
            recordlength :=ForfileReclen(%DESCR sa);
            isize :=recordlength*8;
            writeln('number of pixels=',isize);
            Filenumber :=10;
            ForOpenreadFile(%REF Filenumber,%DESCR sa);
            writeln(' Enter contour filename ');
            readln(s);
            open(f1,s);
            rewrite(f1);
            line :=1;
            done :=false;
200:        Forreadonerecord(%REF filenumber,%REF buf,
                        %REF Recordlength,
                        %REF done);

for k :=1 to recordlength do begin
        rimage :=buf[k];
        for k1 :=1 to 8 do begin
            btst :=uand(rimage,bitv[k1]);
            if btst=bitv[k1] then bitmap[k1+8*(k-1),line] :=1
                            else bitmap[k1+8*(k-1),line] :=0;
        end;
    end;
        writeln('line=',line);
        line :=line+1;

if done<>true then goto 200;
            vsize :=line;

for i :=0 to hsize+1 do begin
            bitmap[i,0] :=0;
            bitmap[i,line] :=0;
        end;

for j :=0 to vsize do begin
            bitmap[0,j] :=0;
            bitmap[hsize+1,j] :=0;
        end;

nc : =8;
        tablex[1] :=0;
        tablex[2] :=-1;
        tablex[3] :=-1;
        tablex[4] :=-1;
        tablex[5] :=0;
        tablex[6] :=1;
        tablex[7] :=1;
        tablex[8] :=1;
        tabley[1] :=-1;
        tabley[2] :=-1;
        tabley[3] :=0;
        tabley[4] :=-1;
        tabley[5] :=-1;
        tabley[6] :=-1;
        tabley[7] :=0;
        tabley[8] :=1;
```

```
      nlabel :=0;
      for iiv :=1 to vsize do begin
        for iih :=1 to hsize do begin
          if bitmap[iih,iiv]=1 then begin
            if (bitmap[iih-1,iiv]=0) or (bitmap[iih+1,iiv]=0) or
               (bitmap[iih,iiv-1]=0) or (bitmap[iih,iiv+1]=0)
              then begin
                pfollow(iih,iiv);
                nlabel :=nlabel+1;
                write(f1,nlabel,iih,iiv,tp-1);
                for i :=1 to tp-1 do begin
                  dx :=xp[i+1]-xp[i];
                  dy :=yp[i+1]-yp[i];
                  if (dx=0) and (dy=1) then c_buf :=6;
                  if (dx=0) and (dy=-1) then c_buf :=2;
                  if (dx=1) and (dy=0) then c_buf :=8;
                  if (dx=-1) and (dy=0) then c_buf :=4;
                  if (dx=1) and (dy=1) then c_buf :=7;
                  if (dx=1) and (dy=-1) then c_buf :=1;
                  if (dx=-1) and (dy=1) then c_buf :=5;
                  if (dx=-1) and (dy=-1) then c_buf :=3;
                  write(f1,c_buf);
                end;
              end;
          end;
        end;
      end;

Forclosefile(%REF filenumber);
    close(f1);

end.
```

APPENDIX B

COPYRIGHT 1990 Eastman Kodak Company

```
program Bvector(input,output);
{This program extracts digital straight
 lines from a chain coded
 picture boundary.} label 100,160,200,201,250,500;

type
    s1          =string[100];

var
    chcode,xy : array[1..1200] of integer;
    xt,yt     : array[1..8] of integer;
    dx,dy,
    xx,yy     : array[1..1200] of integer;
    ia        : array[1..1200] of integer;
    s,sa      : s1;
    f1        : file of integer;
```

```
f2              : file of integer;
i,j,k,
id,
xstr,ystr,
ycount,
nc,
nd,
od,
oc,
nsize,
kc,mc,
ipattern,
jpattern,
ind,
xyount,
nlabel,
index,
kcount,
numline,
x,y,
maxchain        :integer;

begin
    for i :=1 to 1200 do begin
       xx[i] :=0;
       yy[i] :=0;
    end;

xt[1] :=1;
    xt[2] :=0;
    xt[3] :=-1;
    xt[4] :=-1;
    xt[5] :=-1;
    xt[6] :=0;
    xt[7] :=1;
    xt[8] :=1;
    yt[1] :=-1;
    yt[2] :=-1;
    yt[3] :=-1;
    yt[4] :=0;
    yt[5] :=1;
    yt[6] :=1;
    yt[7] :=1;
    yt[8] :=0;

writeln('Enter segmented image filename--->');
    readln(sa);
    s :=concat('d:\pascal\',sa,'.dat');
    assign(f1,s);
    reset(f1);

writeln('Enter linear appr. image filename--->');
    readln(sa);
    s :=concat('d:\pascal\',sa,'.dat');
    assign(f2,s);
    rewrite(f2);
```

```
              i :=1;
              ipattern :=0;
              jpattern :=0;
              ycount :=0;
              repeat
                  numline :=0;
                  index :=1;
                  read(f1,nlabel,x,y,maxchain);
                  for j :=1 to maxchain do begin
                     read(f1,chcode[j]);
                  end;
                  nsize :=maxchain;
                  kc :=1;
                  oc :=0;
                  mc :=0;
                  xyount :=0;
                  j :=1;
                  while j<=nsize do begin
                     nc :=chcode[j];
                     if (j=nsize) and (ycount<>0) then
                         begin
                             ycount :=ycount+1;
                             ia[ycount] :=nc;
                             goto 500;
                         end;
                     if (j=nsize) and (ycount=0) then goto 160;
                     nd :=nc-oc;
                     if nd=-7 then nd :=1;
                     if nd=7 then nd :=-1;
                     if ycount=0 then goto 200;
                     if (nd>1) or (nd<-1) then goto 500;
                     if nd<>0 then goto 250;
                     if (itype=0) and (ycount>=2) then begin
                                                 j :=j-1;
                                                 ycount :=ycount-1;
                                            goto 500;
                                            end;
                     if ipattern=0 then ipattern :=nc;
                     if (ipattern<>nc) then begin
                                              j :=j-1;
                                              ycount :=ycount-1;
                                              goto 500;
                                           end;
                     kc :=kc+1;
                     goto 200;
250:                 if jpattern=0 then jpattern :=nd;
                     if (jpattern<>nd) then begin
                                              j :=j-1;
                                              ycount :=ycount-1;
                                              goto 500;
                                            end;
                     jpattern :=-jpattern;
                     kc :=1;
                     goto 200;

500:            xx[index] :=x;
                yy[index] :=y;
```

```
          for k :=1 to ycount do begin
            x :=x+xt[ia[k]];
            y :=y+yt[ia[k]];
          end;
          index :=index+1;
          xx[index] :=x;
          yy[index] :=y;
          numline :=numline+1;
          index :=index+1;
160:      kount :=0;
          kc :=1;
          ipattern :=0;
          jpattern :=0;
          if j=nsize then goto 100;
          goto 201;

200:      od :=-nd;
          oc :=nc;
          kount :=kount+1;
          ia[kount] :=nc;
          j :=j+1;
201:      end;

100: write(f2,nlabel,numline);
     write(f2,xx[1],yy[1]);
     for i :=1 to numline do begin
        dx[i] :=xx[(i-1)*2+2]-xx[(i-1)*2+1];
        dy[i] :=yy[(i-1)*2+2]-yy[(i-1)*2+1];
     end;
     for i :=1 to numline do begin
        write(f2,dx[i],dy[i]);
     end;

until eof(f1);

close(f1);
     close(f2);

end.
```

APPENDIX C

COPYRIGHT 1990 Eastman Kodak Company

```
program preclss(input,output);
{ Parameters set for 200 DPI } label 9,10,30,101,102,103,104;
CONST
     NOC=2300;
     NUC=1500;
```

```
        NGC=300;
        NOV=1500;
        NOTB=150;
        NOB=80;
        NOE=30;

type
        c_box = record
                    c_index : integer;
                    c_order : integer;
                    status  : char;
                    width   : integer;
                    height  : integer;
                    min_x   : integer;
                    min_y   : integer;
                    max_x   : integer;
                    max_y   : integer;
                    xcent   : integer;
                    ycent   : integer;
                    r_area  : real;
                    b_area  : real;
                    xy_ratio: real;
                    area_rt : real;
                    i_holes : integer;
                    o_holes : integer;
                    fptr    : array[0..5] of integer;
                    bptr    : array[0..5] of integer;
                end;

c_box_ptr =^c_box;

g_box = record
                    box_tag : integer;
                    status  : char;
                    c_order : integer;
                    width   : integer;
                    height  : integer;
                    min_x   : integer;
                    min_y   : integer;
                    r_area  : real;
                    area_rt : real;
                    xcent   : integer;
                    ycent   : integer;
                    num_v   : integer;
                    o_setx  : integer;
                    o_sety  : integer;
                end;
        etx,cstatus           : char;
        class                 : char;
        isp                   : st10;
        find_graphics,
        out_to_in,
        in_to_out,
        find_hole_tst,
        find_inner,
        find_start,
        start_find,
        out_box_find          : boolean;
```

```
procedure initialize (var addr,level : integer);
                  external 't488init';

procedure send (var addr    : integer;
                var pltter  : sdesc;
                var status  : integer);
                external 't488send';

procedure pen(select : char);
begin
    pltter :=concat('pu;sp',select,';');
    sendesc.addr := ofs(pltter)+1;
    sendesc.len := length(pltter);
    send(adddr,sendesc,status);
end;

procedure pplot(ipud :integer; x,y : integer);
var
   ix,iy            :integer;

begin
  ix :=round(x);
  iy :=round(y);
  if ipud=1 then begin
     pltter := 'pd;';
     sendesc.len := length(pltter);
     send(adddr,sendesc,status);
  end
  else begin
     pltter := 'pu;';
     sendesc.len := length(pltter);
     send(adddr,sendesc,status);
  end;
     str(ix:4,a);
     str(iy:4,b);
     pltter := concat('VS',isp,';','pa',a,',',b,';');
     sendesc.len := length(pltter);
     send(adddr,sendesc,status);
end;

g_box_ptr =^g_box;

p_box = record
              status  : char;
              min_x   : integer;
              min_y   : integer;
              width   : integer;
              height  : integer;
              area_rt : real;
              r_area  : real;
              n_ptr   : integer;
              ptr     : array[1..3] of integer;
             end;
     p_box_ptr =^p_box;

t_box = record
              box_tag : integer;
              min_x   : integer;
              min_y   : integer;
              max_x   : integer;
```

```
                max_y    : integer;
                width    : integer;
                height   : integer;
              end;

b_box = record
              c_order : integer;
              status  : char;
              min_x   : integer;
              min_y   : integer;
              width   : integer;
              height  : integer;
              area_rt : real;
              r_area  : real;
              n_ptr   : integer;
              ptr     : array[1..10] of integer;
            end;

Gr = record
           com   : integer;
           min_x : integer;
           min_y : integer;
           max_x : integer;
           max_y : integer;
         end;

com_box = array[1..4000] of p_box_ptr;

r_one_d = array[1..20] of real;
    r_one_ptr =^r_one_d;
    i_one_d = array[1..20] of integer;
    i_one_ptr =^i_one_d;

scom = array[0..NOV] of integer;
    ptr_scom =^scom;

st10    =string[10];
    slong   =string[100];
    s1      = string[80];
    data    = file of integer;
    sdesc   = record
                len  : byte;
                addr : integer;
              end;

var
    com_id              : com_box;
    out_Gr              : array[1..30] of Gr;
    c_boxs              : array[1..NOC] of c_box_ptr;
    u_boxs              : array[1..NUC] of c_box_ptr;
    g_boxs              : array[1..NGC] of g_box_ptr;
    t_boxs              : array[1..NOTB] of t_box;
    c_buf               : b_box;
    x_ptr,u_ptr         : array[1..NOB,1..NOE] of integer;
    y_ptr,
    c_str,c_end,
    bymin,bymax         : array[1..NOB] of integer;
    nx_ptr_str,
    nx_ptr_end          : array[1..NOB,1..NOE] of integer;
    u_ptr_str,
```

```
    u_ptr_end           : array[1..NOB] of integer;
num_seg,
new_num_seg             : array[1..NOB] of integer;
dx,dy,
xb,yb                   : ptr_scom;
row_mean_area,
row_mean_width,
row_mean_height,
in_area_ratio           : array[1..NOB] of real;
row_hmax,
row_max                 : array[1..NOB] of integer;
local_mean_a            : array[1..NOB] of r_one_ptr;
local_mean_h,
local_mean_w,
new_local_mean_h,
new_local_mean_w,
local_bund_h            : array[1..NOB] of i_one_ptr;
bitrev                  : array[1..NOB] of boolean;
xmin,
xmax,
ymin,
ymax,
art_char,
xcenter,
ycenter,
xstr,ystr,
lne                     : integer;
Lx,Ly, g_box_ptr =^g_box;

p_box = record
            status  : char;
            min_x   : integer;
            min_y   : integer;
            width   : integer;
            height  : integer;
            area_rt : real;
            r_area  : real;
            n_ptr   : integer;
            ptr     : array[1..3] of integer;
          end;
    p_box_ptr =^p_box;

t_box = record
            box_tag : integer;
            min_x   : integer;
            min_y   : integer;
            max_x   : integer;
            max_y   : integer;
            width   : integer;
            height  : integer;
          end;

b_box = record
            c_order : integer;
            status  : char;
            min_x   : integer;
            min_y   : integer;
            width   : integer;
```

```
            height   : integer;
            area_rt  : real;
            r_area   : real;
            n_ptr    : integer;
            ptr      : array[1..10] of integer;
          end;

Gr = record
          com   : integer;
          min_x : integer;
          min_y : integer;
          max_x : integer;
          max_y : integer;
        end;

com_box = array[1..4000] of p_box_ptr;

r_one_d = array[1..20] of real;
  r_one_ptr =^r_one_d;
  i_one_d = array[1..20] of integer;
  i_one_ptr =^i_one_d;

scom = array[0..NOV] of integer;

sign_tst,
  bx_area,
  ratio_a              : real;
  pltter               : slong;
  s,
  st,ans,ips,
  a,b,c,d              : string[40];
  a1,a2,a3,
  a4,a5,a6             : s1;
  f1,f4,f5             : data;
  f2,f3                : text;
  sendesc              : sdesc;
  alb,
  i,j,
  pts,
  pn,
  ps,tx,
  total,
  ty,
  addr,
  adddr,
  level,
  lb,
  status,
  k1,
  k2,
  kk1,
  kk2,
  xd,
  yd,
  t_com,
  u_com,
  index,
  t_line,
  tt_boxs,
```

```
x_index,
deltx,
delty1,
delty2,
delty,
c_distance,
c_width,
p1,p2,
ptr1_x,
ptr2_x,
ptr1_y,
ptr2_y,
g_com,
ic,icc,
Th_4,
element_count,
c_index,
local_wdth_max,
local_hght_max,
local_h,
local_w,
b_max,
b_min,
h_max,
y_max,
c_count,
nu_com,
lc_count,
acc_index,
height_min,
out_bound_ymin,
out_bound_ymax,
out_bound_xmin,
out_bound_xmax,
wdth_max,
hght_max,
k,u_index,
ku,
i_index,
i_com,
o_ic,o_iu,
i_ic,i_iu,
u_xcenter,
u_ycenter,
u_left,
u_right,
u_top,
u_btm,
x_delta,
y_delta,
x_left,
x_right,
y_top,
y_btm,
x_center,
y_center,
n_holes,
str_count,
s_count,
num_com,
```

```
              sel,
              big_com_count,
              u_cntr,
              u1,
              p22,
              p11,
              sum_count,
              b_count,
              sum_height,
              est_chr_size,
              num_ouside_inner,
              num_ouside_outer,
              num_inside_inner,
              num_inside_outer,
              g_row_box,
              count_G,
              n_char,
              i_row,
              i_old,
              x_str,
              x_end,
              yrev,
              nrev,
              zerox,
              zeroy              : integer;
              a_ratio,
              x2,y2,
              xlow,
              ylow,
              xmid,
              ymid,
              ave_area,
              ave_width,
              ave_height,
              local_area_max,
              sum_area_rt,
              ave_area_rt,
              area_max,
              local_a,
              delta,
              d_ratio,
              ave_area_ratio,
              sum_area_ratio,
              scalex,
              scaley,
              x,y,t,plota,
              a1,d1,d2,
              h_21,h_23,
              r1,r2,
              ar1,ar2,
              br2,
              a_ave,r_ave,
              x11,x22,
              y11,y22,
              vx1,vy1,
              plotb              : real;
              xx1,xx2,
              yy1,yy2,
              x1,y1,
              Isize,
```

```
Jsize,
h1,
i1,i2,i3,ii,
nlabel,
xs1,ys1,
xs2,ys2,
maxchain            : integer;

procedure classifier(x_size,y_size: real;
                     nline: integer;
                     area_tst,t_ratio :real;
                     var aspect_ratio :real;
                     var c_class: char);

var
    k,k1,k3         : integer;

begin
        aspect_ratio :=y_size/x_size;
        if ((aspect_ratio<0.1) and (y_size<20) and (area_tst>0))
           or ((aspect_ratio>15) and (x_size<20) and (area_tst>0))
            then c_class :='L' else
        if ((x_size<12) and (y_size<12) and (area_tst>0))
           then c_class :='D' else
            if    (x_size>200)    or    (y_size>200)    or
(abs(area_tst)>22500.0)                then c_class :='G' else
        if area_tst>0
            then c_class :='t'
            else c_class :='u'
end;

Procedure bound_size(x_str,y_str,nline :integer;
                     var x_min,y_min,x_max,y_max : integer;
                     var x_size,y_size: real;
                     var xc,yc: integer;
                     var area: real;
                     var area_box : real;
                     var area_ratio : real;
                     var aspect_ratio : real;
                     var cstatus:char);

var
    k,k1,k3       :integer;
    xb1,yb1,
    xbk1,xbk3,
    ybk1,ybk3     : real;

begin
    x_min :=5000;
    y_min :=5000;
    x_max :=0;
    y_max :=0;
    xb^[1] :=x_str;
    yb^[1] :=y_str;
    if xb^[1]>x_max then x_max :=xb^[1];
    if xb^[1]<x_min then x_min :=xb^[1];
    if yb^[1]>y_max then y_max :=yb^[1];
    if yb^[1]<y_min then y_min :=yb^[1];
```

```
        for k :=1 to nline do begin
          k1 :=k+1;
          xb^[k1] :=xb^[k]+dx^[k];
          yb^[k1] :=yb^[k]+dy^[k];
          if xb^[k1]>x_max then x_max :=xb^[k1];
          if xb^[k1]<x_min then x_min :=xb^[k1];
          if yb^[k1]>y_max then y_max :=yb^[k1];
          if yb^[k1]<y_min then y_min :=yb^[k1];
        end;
        x_size :=x_max-x_min;
        y_size :=y_max-y_min;
        area_box :=x_size*y_size;
        k :=2;
        area :=0;
        xb1 :=xb^[1];
        yb1 :=yb^[1];
        while k<=nline-1 do begin
          k1 :=k;
          k3 :=k1+1;
          xbk1 :=xb^[k1];
          xbk3 :=xb^[k3];
          ybk1 :=yb^[k1];
          ybk3 :=yb^[k3];
          area :=area+(xbk1-xb1)*(ybk3-yb1)
                 -(xbk3-xb1)*(ybk1-yb1);
          k :=k3;
        end;
        area :=area/2;
        area_ratio :=abs(area)/area_box;
        classifier(x_size,y_size,nline,area,area_ratio,
                 aspect_ratio,cstatus);
        xc :=x_min+round(x_size/2);
        yc :=y_min+round(y_size/2);

end;

procedure dat_input;

begin
     read(f1,nlabel,lne);
     read(f1,xstr,ystr);
     for i :=1 to lne do begin
        read(f1,dx^[i],dy^[i]);
     end;
end;

procedure com_analysis;

begin bound_size(xstr,ystr,lne,xmin,ymin,xmax,
             ymax,Lx,Ly,xcenter,ycenter,
             sign_tst,bx_area,ratio_a,d_ratio,class);

end;

procedure com_save;

var
    ib : integer;
```

```
begin
  if class='t' then begin
                    t_com :=t_com+1;
                    with c_boxs[t_com]^ do
                      begin
                        c_index :=t_com;
                        c_order :=nlabel;
                        status  :='t';
                        min_x   :=xmin;
                        min_y   :=ymin;
                        max_x   :=xmax;
                          max_y    :=ymax;
                          width    :=round(Lx);
                          height   :=round(Ly);
                          xcent    :=xcenter;
                          ycent    :=ycenter;
                          r_area   :=sign_tst;
                          b_area   :=bx_area;
                          xy_ratio :=d_ratio;
                          area_rt  :=ratio_a;
                        end;
                        if (d_ratio>0.8) and (d_ratio<3) ,
                    and (ycenter>out_bound_ymin)
                and (ycenter<out_bound_ymax)
            and (xcenter>out_bound_xmin)
      and (xcenter<out_bound_xmax)                                                 then
{excluding touching strings}                                                       begin
                          c_count :=c_count+1;
                          if area_max<c_boxs[t_com]^.r_area
                                 then    area_max
:=c_boxs[t_com]^.r_area;                                                     if
wdth_max<c_boxs[t_com]^.width
then wdth_max :=c_boxs[t_com]^.width;
   if hght_max<c_boxs[t_com]^.height
     then hght_max :=c_boxs[t_com]^.height;
         sum_height :=sum_height+c_boxs[t_com]^.height;
                  end;
                end;

if (class='G') or (class='L') or (class='D') then begin
g_com :=g_com+1;
     writeln('g_com=',g_com,' sign_tst=',sign_tst);
     if (sign_tst>100000.0) and (Ly>50) then begin
       if out_bound_ymin>ymin then out_bound_ymin :=ymin;
       if out_bound_ymax<ymax then out_bound_ymax :=ymax;
       if out_bound_xmin>xmin then out_bound_xmin :=xmin;
       if out_bound_xmax<xmax then out_bound_xmax :=xmax;
     end;
       with g_boxs[g_com]^ do begin
          box_tag :=g_com;
          status  :=class;
          c_order :=nlabel;
          min_x   :=xmin;
          min_y   :=ymin;
          xcent   :=xcenter;
          ycent   :=ycenter;
          width   :=round(Lx);
          height  :=round(Ly);
          r_area  :=sign_tst;
```

```
              area_rt :=ratio_a;
           end;
        end;

if class='u' then begin
                                u_com :=u_com+1;
                                writeln('u_com=',u_com);
                                with u_boxs[u_com]^ do
                                   begin
                                     c_index  :=u_com;
                                     c_order  :=nlabel;
                                     status   :='u';
                                     min_x    :=xmin;
                                     min_y    :=ymin;
                                     max_x    :=xmax;
                                     max_y    :=ymax;
                                     width    :=round(Lx);
                                     height   :=round(Ly);
                                     xcent    :=xcenter;
                                     ycent    :=ycenter;
                                     r_area   :=sign_tst;
                                     b_area   :=bx_area;
                                     xy_ratio :=d_ratio;
                                     area_rt  :=ratio_a;
                                   end;
                             end;
end;

procedure partition(lb,ub: integer; var j :integer);

var
   up,down       : integer;
   a,ap, temp    : integer;
   found         : boolean;

begin
     ap :=c_boxs[lb]^.c_index;
     a  :=c_boxs[ap]^.min_x;
     up :=ub;
     down :=lb;
     while down<up do
        begin
             while  (c_boxs[c_boxs[down]^.c_index]^.min_x<=a)  and
(down<ub)            do down :=down+1;
             while  c_boxs[c_boxs[up]^.c_index]^.min_x>a  do  up
:=up-1;           if down<up then
                begin
                    temp :=c_boxs[up]^.c_index;
                    c_boxs[up]^.c_index :=c_boxs[down]^.c_index;
                  c_boxs[down]^.c_index :=temp;
                end;
        end;
        c_boxs[lb]^.c_index :=c_boxs[up]^.c_index;
        c_boxs[up]^.c_index :=ap;
        j :=up;
end;

procedure quick(lb,ub: integer);
var
```

```
        j :integer;

begin
    if lb<ub then
        begin
            partition(lb,ub,j);
            quick(lb,j-1);
            quick(j+1,ub);
        end;
end;

function min(a1,a2 : integer): integer;
begin
    min :=a1;
    if a1>a2 then min :=a2;
end;

function max(a1,a2 : integer): integer;
begin
    max :=a2;
    if a1>a2 then max :=a1;
end;

procedure find_min_max(ii:integer; var min_y,max_y : integer);

var
    j : integer;

begin
    min_y :=5000;
    max_y :=0;
    for j :=y_ptr[ii] to y_ptr[ii+1]-1 do begin
        if c_boxs[j]^.min_y<min_y then min_y :=c_boxs[j]^.min_y;
    if c_boxs[j]^.max_y>max_y then max_y :=c_boxs[j]^.max_y;     end;
end;

procedure sub_boxs(row,k_index: integer);

type
    class = record
                c       : integer;
                min_x   : integer;
                min_y   : integer;
                max_x   : integer;
                max_y   : integer;
                width   : integer;
                height  : integer;
            end;

var
    s_g   : array[1..40,1..90] of class;
    count : array[1..90] of integer;
    overlap : array[1..90] of integer;
    ig,icg,
    sb,ip0,
    k,dist,
    max_h,
    ipnew,
    diff,min_h,
```

```
              cov_min,cov_max,
              cen_new,
              cen_old,
              cen_off,
              ip,ave_h,
              test_exist,
              pnew_xmin,
              pnew_xmax,
              pnew_ymin,
              pnew_ymax,
              pnew_width,
              pnew_height     : integer;

begin writeln('***  k_index=',k_index,'  ****');
          sb :=1;
          for k :=1 to 90 do
            count[k] :=1;

ip0 :=c_boxs[nx_ptr_str[row,k_index]]^.c_index;

with s_g[sb,1] do
            begin
              c       :=nx_ptr_str[row,k_index];
              min_x :=c_boxs[ip0]^.min_x;
              min_y :=c_boxs[ip0]^.min_y;
              max_x :=c_boxs[ip0]^.max_x;
              max_y :=c_boxs[ip0]^.max_y;
              height :=c_boxs[ip0]^.height;
              width :=c_boxs[ip0]^.width;
            end;

for ip :=nx_ptr_str[row,k_index]+1 to nx_ptr_end[row,k_index]
   do       begin
              ipnew :=c_boxs[ip]^.c_index;
              pnew_xmin :=c_boxs[ipnew]^.min_x;
              pnew_ymin :=c_boxs[ipnew]^.min_y;
              pnew_xmax :=c_boxs[ipnew]^.max_x;
              pnew_ymax :=c_boxs[ipnew]^.max_y;
              pnew_width :=c_boxs[ipnew]^.width;
              pnew_height :=c_boxs[ipnew]^.height;

test_exist :=0;

writeln('sb=',sb);

for k :=1 to sb do begin
                overlap[k] :=min(pnew_ymax-s_g[k,count[k]].min_y,
                        s_g[k,count[k]].max_y-pnew_ymin);
end;

for k :=1 to sb do begin
                if overlap[k]>0 then begin
                  cov_max :=pnew_ymax-s_g[k,count[k]].max_y;
                  cov_min :=pnew_ymin-s_g[k,count[k]].min_y;
                  diff :=abs(pnew_height-s_g[k,count[k]].height);
                cen_new :=round((pnew_ymin+pnew_ymax)/2);
                                              cen_old
```

```
             :=round((s_g[k,count[k]].max_y+s_g[k,count[k]].min_y)/2);
     cen_off :=pnew_xmin-s_g[k,count[k]].max_x;
                                                                  min_h
:=min(pnew_height,new_local_mean_h[row]^[k_index]);
max_h :=max(pnew_height,new_local_mean_h[row]^[k_index]);
     if (cen_off<2*new_local_mean_w[row]^[k_index]) and
        (overlap[k]>0.2*min_h)
                then
                   begin
                      test_exist :=test_exist+1;
                      count[k] :=count[k]+1;
                      s_g[k,count[k]].c :=ip;
                      s_g[k,count[k]].min_x :=pnew_xmin;
                      s_g[k,count[k]].min_y :=pnew_ymin;
                      s_g[k,count[k]].max_x :=pnew_xmax;
                      s_g[k,count[k]].max_y :=pnew_ymax;
                      s_g[k,count[k]].width :=pnew_width;
                      s_g[k,count[k]].height :=pnew_height;
                   end;
          end;
     end;

{ create a new segment }
        if test_exist=0 then begin
          sb :=sb+1;
          s_g[sb,1].c :=ip;
          s_g[sb,1].min_x :=pnew_xmin;
          s_g[sb,1].min_y :=pnew_ymin;
          s_g[sb,1].max_x :=pnew_xmax;
          s_g[sb,1].max_y :=pnew_ymax;
          s_g[sb,1].width :=pnew_width;
          s_g[sb,1].height :=pnew_height;
        end;
     end;

{ compute the text boxes } for k :=1 to sb do begin
        g_row_box :=g_row_box+1;
        acc_index :=acc_index+1;
        with t_boxs[acc_index] do
           begin
              write(f2,acc_index:5,row:5,g_row_box:5,count[k]:5);
                                       writeln(f2,'
',new_local_mean_h[row]^[k_index]:5,new_local_mean_w[row]^[k_inde
x]:5);          min_x :=5000;
              min_y :=5000;
              max_x :=0;
              max_y :=0;
              if  count[k]<=0  then  writeln(lst,'k=',k,' warning
count=',count[k]);           for ig :=1 to count[k] do begin
              icg :=s_g[k,ig].c;
              icc :=c_boxs[icg]^.c_index;
              writeln(f2,c_boxs[icc]^.c_order:5);
              if    c_boxs[icc]^.min_x<min_x    then    min_x
:=c_boxs[icc]^.min_x;              if c_boxs[icc]^.min_y<min_y
then min_y :=c_boxs[icc]^.min_y;                              if
c_boxs[icc]^.max_x>max_x then max_x :=c_boxs[icc]^.max_x;
     if c_boxs[icc]^.max_y>max_y then max_y :=c_boxs[icc]^.max_y;
           end;
```

```
            width :=max_x-min_x+1;
            height:=max_y-min_y+1;
            writeln(f2,min_x:5,min_y:5,width:5,height:5);
          end;
        end;
end;

function box_high(ii,jj :integer):integer;

var
  min_y,
  max_y,
  kk,kp  : integer;

begin
  min_y :=5000;
  max_y :=0;
  for kk :=nx_ptr_str[ii,jj] to nx_ptr_end[ii,jj] do begin
    kp :=c_boxs[kk]^.c_index;
    if c_boxs[kp]^.min_y<min_y then min_y :=c_boxs[kp]^.min_y;
if c_boxs[kp]^.max_y>max_y then max_y :=c_boxs[kp]^.max_y;     end;
  box_high :=max_y-min_y+1;
end;

procedure s_box(row,jj :integer);

var
  min_y,
  max_y,
  min_x,
  max_x,
  kk,kp  : integer;

begin
  acc_index :=acc_index+1;
  with t_boxs[acc_index] do begin
    min_x :=5000;
    max_x :=0;
    min_y :=5000;
    max_y :=0;
    g_row_box :=0;
    n_char :=nx_ptr_end[row,jj]-nx_ptr_str[row,jj]+1;
    write(f2,acc_index:5,row:5,g_row_box:5,n_char:5);
            w r i t e l n ( f 2 ,  '
',new_local_mean_h[row]^[jj]:5,new_local_mean_w[row]^[jj]:5);
for kk :=nx_ptr_str[row,jj] to nx_ptr_end[row,jj] do begin      kp
:=c_boxs[kk]^.c_index;
      writeln(f2,c_boxs[kp]^.c_order:5);
        if c_boxs[kp]^.min_x<min_x then min_x :=c_boxs[kp]^.min_x;
      if c_boxs[kp]^.max_x>max_x then max_x :=c_boxs[kp]^.max_x;
    if c_boxs[kp]^.min_y<min_y then min_y :=c_boxs[kp]^.min_y;
if c_boxs[kp]^.max_y>max_y then max_y :=c_boxs[kp]^.max_y;       end;
    width :=max_x-min_x+1;
    height :=max_y-min_y+1;
    writeln(f2,min_x:5,min_y:5,width:5,height:5);
  end;
end;
```

```
begin for i :=1 to NOB do new(local_mean_a[i]);
    for i :=1 to NOB do new(local_mean_h[i]);
    for i :=1 to NOB do new(local_mean_w[i]);
    for i :=1 to NOB do new(local_bund_h[i]);
    for i :=1 to NOB do new(new_local_mean_h[i]);
    for i :=1 to NOB do new(new_local_mean_w[i]);
    for i :=1 to NOC do new(c_boxs[i]);
    new(dx);
    new(dy);
    new(xb);
    new(yb);
    for i :=1 to NUC do new(u_boxs[i]);
    for i :=1 to NGC do new(g_boxs[i]);
    addr := 18;
    adddr :=5;
    level := 0;
    initialize(addr,level);

writeln('Select plotting speed 1-36');
    readln(isp);

pltter := 'in;ip 0,0,10000,7790;SC -100,3850,0,3070;';
    sendesc.addr := ofs(pltter)+1;
    sendesc.len := length(pltter);
    send(adddr,sendesc,status);
    clrscr;

writeln(' ');
    writeln('
    vecplot'); writeln(' ');
    writeln('Enter the Lines Filename (input)...');
    write('(*.DAT) ---> ');
    readln(ans);
    s := concat('c:\formdat\',ans,'.dat');
    assign(f1,s);
    reset(f1);

s := concat('c:\formdat\',ans,'.box');
    assign(f2,s);
    rewrite(f2);

s := concat('c:\formdat\',ans,'.cls');
    assign(f3,s);
    rewrite(f3);

s := concat('c:\formdat\',ans,'.otg');
    assign(f4,s);
    rewrite(f4);

s := concat('c:\formdat\',ans,'.row');
    assign(f5,s);
    rewrite(f5);

t_com :=0;
    g_com :=0;
    u_com :=0;
    acc_index :=0;
```

```
        c_count :=0;
        ave_area :=0;
        ave_width :=0;
        ave_height :=0;
        out_bound_ymin :=5000;
        out_bound_ymax :=0;
        out_bound_xmin :=5000;
        out_bound_xmax :=0;
        area_max :=0;

writeln(f3,com_id[i]^.height);
        writeln(f3,com_id[i]^.r_area:10:5);
        writeln(f3,com_id[i]^.area_rt:10:5);
        writeln(f3,com_id[i]^.n_ptr);
          if   com_id[i]^.n_ptr>=10   then   writeln('i=',i,'
n_ptr=',com_id[i]^.n_ptr,'>10');    if (com_id[i]^.n_ptr>0)  and
(com_id[i]^.n_ptr<10) then
            for j :=1 to com_id[i]^.n_ptr do
              writeln(f3,com_id[i]^.ptr[j]);
end;

writeln( '****** number of G =',count_G);
  for i :=1 to count_G do
    with out_Gr[i] do begin
       writeln('i=',i,' min_x=',min_x,' min_y=',min_y,' wdth=',max_x-
min_x,' hght=',max_y-min_y);   end;

for i :=1 to 4000 do dispose(com_id[i]);

close(f2);
close(f3);
close(f1);
close(f4);
close(f5);

end.
```

APPENDIX D

COPYRIGHT 1990 Eastman Kodak Company

```
/*******************************************************************/
/*                                                                 */
/*  This file contains the functions used to detect touching character */
/*  components.                                                    */
/*                                                                 */
/*******************************************************************/ include "ocrdefs.h"
include "ocr_global_vars.h"
#include <suntool/sunview.h>
#include <suntool/canvas.h>

/*******************************************************************/
/*                                                                 */
/*  is_touching_character                                          */
/*  =====================                                          */
/*      Takes a contour and page pointer as input and returns TRUE if */
```

```
/*    the contour is found to be a touching  character component as      */
/*    determined by a set of heuristic rules, FALSE otherwise.            */
/*                                                                        */
/**************************************************************************/ int
is_touching_character( contour, page )

CONTOUR *contour;
PAGE *page;

{
   switch( contour->hole_count )
   {
      case 0  :   return(no_hole_touching_char_check(contour)); break;

case 1  :   return(one_hole_touching_char_check(contour,page)); break;

case 2  :   return(two_hole_touching_char_check(contour,page)); break;

default :   return(TRUE);
   }
}

/**************************************************************************/
/*                                                                        */
/*  two_hole_touching_char_check                                          */
/*  ===============================                                       */
/*                                                                        */
/*       Takes a two-holed contour and page pointer as input. Using the   */
/*  page information to access the inner contours (the two holes), this   */
/*  function determines whether a contour with two holes is a touching    */
/*  character component. If the hole contours are found to be             */
/*  horizontally adjacent, the outer contour is classified as a           */
/*  touching character component and TRUE is returned, otherwise FALSE    */
/*  is returned.                                                          */
/*                                                                        */
/**************************************************************************/ int
two_hole_touching_char_check( contour, page )

CONTOUR *contour;
PAGE *page;
{
   CONTOUR *hole1, *hole2;

hole1 = &page->contours[contour->holes[0]];
   hole2 = &page->contours[contour->holes[1]];
   return(horizontally_adjacent(hole1,hole2));
}

/**************************************************************************/
/*                                                                        */
/*  horizontally_adjacent                                                 */
/*  =====================                                                 */
/*       Called on to determine if the two contours passed as input       */
/*  parameters are horizontally adjacent, i.e. the x-values of the        */
/*  horizontal line segments of their bounding boxes do not overlap.      */
/*  Returns TRUE if the contours are found to be horizontally adjacent,   */
/*  FALSE otherwise.                                                      */
/*                                                                        */
/**************************************************************************/ int
horizontally_adjacent( contour1, contour2 )
```

```
CONTOUR *contour1, *contour2;

{
  int left1, right1, left2, right2;

left1 = contour1->feature.box.x0;
  right1 = left1 + contour1->feature.box.width;
  left2 = contour2->feature.box.x0;
  right2 = left2 + contour2->feature.box.width;

if ((left1 > right2) || (left2 > right1))
    return(TRUE);
    else return(FALSE);
}

/****************************************************************/
/*                                                              */
/*   one_hole_touching_char_check                               */
/*   ============================                               */
/*                                                              */
/****************************************************************/ int
one_hole_touching_char_check( contour, page )

CONTOUR *contour;
PAGE *page;

{
  CONTOUR *hole;
  float hole_midpoint;
  float normalized_hole_midpoint;

hole = &page->contours[contour->holes[0]];

hole_midpoint = 1.0*hole->feature.box.x0 + 1.0*hole->feature.box.width/2.0;
  normalized_hole_midpoint = (hole_midpoint - 1.0*contour->feature.box.x0) /
                             (1.0*contour->feature.box.width);

if (approx_equal(normalized_hole_midpoint,0.5,0.15) == TRUE)
    return(FALSE);
    else return(TRUE);
}

/****************************************************************/
/*                                                              */
/*   no_hole_touching_char_check                                */
/*   ===========================                                */
/*                                                              */
/****************************************************************/ int
no_hole_touching_char_check( contour )

CONTOUR *contour;

{
  int line;

for (line = TOP; line <= BOTTOM; line++)
    if (contour->feature.horizontal_ints[line] > 8)
      return(TRUE);
  if ((contour->feature.horizontal_ints[TOP] == 2) &&
      (contour->feature.horizontal_ints[MIDDLE] >= 6))
    return(TRUE);
```

```
      if ((contour->feature.horizontal_ints[MIDDLE] >= 6) &&
          (contour->feature.horizontal_ints[BOTTOM] == 2))
        return(TRUE);
      return(FALSE);
}

/*********************************************************************/
/*                                                                   */
/*  split_touching_character                                         */
/*  =========================                                        */
/*                                                                   */
/*********************************************************************/ split_touching_character( contour, pw  )

CONTOUR *contour;
Pixwin *pw;

{
  int numbytes;
  int num_vectors_traversed;
  int X1, X2, Y1, Y2;
  int x_save, y_save;
  float split_line;
  CONTOUR *new_contour1, *new_contour2;
  struct vector *vector_ptr, *new_vector_ptr1, *new_vector_ptr2;

new_contour1 = (CONTOUR *)malloc(sizeof(CONTOUR));
  new_contour2 = (CONTOUR *)malloc(sizeof(CONTOUR));
  numbytes = contour->vector_count * sizeof(struct vector);
  new_contour1->vector_data = (struct vector *)malloc(numbytes);
  new_contour2->vector_data = (struct vector *)malloc(numbytes);
  new_contour1->vector_count = 0;
  new_contour2->vector_count = 0;
  new_contour1->offset_x = contour->offset_x;
  new_contour1->offset_y = contour->offset_y;

num_vectors_traversed = 0;
  vector_ptr = contour->vector_data;
  new_vector_ptr1 = new_contour1->vector_data;
  new_vector_ptr2 = new_contour2->vector_data;

split_line = 1.0*contour->feature.box.x0
             + 1.0*contour->feature.box.width / 2.0;
  X1 = contour->offset_x;
  Y1 = contour->offset_y;
  X2 = X1 + vector_ptr->x;
  Y2 = Y1 + vector_ptr->y;

while (intersect(X1, X2, split_line) != TRUE)
  {
    pw_vector(pw, X1, Y1, X2, Y2, PIX_SRC, 1);
    new_vector_ptr1->x = vector_ptr->x;
    new_vector_ptr1->y = vector_ptr->y;
    new_contour1->vector_count++;
    new_vector_ptr1++;
    vector_ptr++;
    num_vectors_traversed++;
    X1 = X2;
    Y1 = Y2;
    X2 = X1 + vector_ptr->x;
    Y2 = Y1 + vector_ptr->y;
  }
```

```c
    vector_ptr++;
    num_vectors_traversed++;
    x_save = X1;
    y_save = Y1;
    X1 = X2;
    Y1 = Y2;
    X2 = X1 + vector_ptr->x;
    Y2 = Y1 + vector_ptr->y;

new_contour2->offset_x = X1;
    new_contour2->offset_y = Y1;

while (intersect(X1, X2, split_line) != TRUE)
    {
      pw_vector(pw, X1, Y1, X2, Y2, PIX_SRC, 1);
      new_vector_ptr2->x = vector_ptr->x;
      new_vector_ptr2->y = vector_ptr->y;
      new_contour2->vector_count++;
      new_vector_ptr2++;
      vector_ptr++;
      num_vectors_traversed++;
      X1 = X2;
      Y1 = Y2;
      X2 = X1 + vector_ptr->x;
      Y2 = Y1 + vector_ptr->y;
    }
    new_vector_ptr2->x = new_contour2->offset_x - X1;
    new_vector_ptr2->y = new_contour2->offset_y - Y1;
    new_contour2->vector_count++;
    pw_vector(pw,X1,Y1,new_contour2->offset_x,new_contour2->offset_y,PIX_SRC,1);

new_vector_ptr1->x = X2 - x_save;
    new_vector_ptr1->y = Y2 - y_save;
    new_contour1->vector_count++;
    pw_vector(pw,x_save,y_save,X2,Y2,PIX_SRC,1);
    new_vector_ptr1++;

vector_ptr++;
    num_vectors_traversed++;
    X1 = X2;
    Y1 = Y2;
    X2 = X1 + vector_ptr->x;
    Y2 = Y1 + vector_ptr->y;

while (num_vectors_traversed < contour->vector_count)
    {
      pw_vector(pw, X1, Y1, X2, Y2, PIX_SRC, 1);
      new_vector_ptr1->x = vector_ptr->x;
      new_vector_ptr1->y = vector_ptr->y;
      new_contour1->vector_count++;
      new_vector_ptr1++;
      vector_ptr++;
      num_vectors_traversed++;
      X1 = X2;
      Y1 = Y2;
      X2 = X1 + vector_ptr->x;
      Y2 = Y1 + vector_ptr->y;
    }
}
```

APPENDIX E

COPYRIGHT 1990 Eastman Kodak Company

```
#include "ocrdefs.h"
include "ocr_global_vars.h"
#include <math.h>
#include <suntool/sunview.h>
#include <suntool/canvas.h>

/***************************************************************/
/*                                                               */
/*  traverse_contour                                             */
/*  =================                                            */
/*      Called on by process_contour to traverse the boundary contour */
/*      of the given unknown text component and extract certain  */
/*      features which require a sequential vector traversal of the */
/*      contour. These features are contour perimeter, intersection */
/*      codes and intersection points between the contour and the 3x3 */
/*      grid superimposed upon it.                               */
/*                                                               */
/***************************************************************/ void
traverse_contour(contour, pw)

CONTOUR *contour;
Pixwin *pw;

{
  register int vec;
  int dx, dy;
  int line;
  register int X1, Y1, X2, Y2;
  struct vector *vector_ptr;

X1 = contour->offset_x;
  Y1 = contour->offset_y;
  cx[1] = X1;
  cy[1] = Y1;
  vector_ptr = contour->vector_data;

for( vec = 1; vec <= contour->vector_count; vec++ )
  {
    dx = vector_ptr->x;
    dy = vector_ptr->y;
    X2 = X1 + dx;
    Y2 = Y1 + dy;
    pw_vector(pw, X1, Y1, X2, Y2, PIX_SRC, 3);
    perimeter = perimeter + sqrt(1.0*(dx*dx + dy*dy));
    cx[vec+1] = X2;
    cy[vec+1] = Y2;
    for (line = LEFT; line <= RIGHT; line++)
       if (intersect(X1,X2,vertical_line[line]) == TRUE)
          contour->feature.vertical_ints[line]++;
    for (line = TOP; line <= BOTTOM; line++)
       if (intersect(Y1,Y2,horizontal_line[line]) == TRUE)
          contour->feature.horizontal_ints[line]++;
    find_intersection_points(X1,Y1,X2,Y2,vec);
    X1 = X2;
```

```c
    Y1 = Y2;
    vector_ptr++;
  }
Vcode = contour->feature.vertical_ints[MIDDLE];
   Hcode = contour->feature.horizontal_ints[MIDDLE];
}

/****************************************************************************/
/*                                                                          */
/*  process_contour                                                         */
/*  ===============                                                         */
/*      Called on by process_page to extract features from the given        */
/*      unknown text contour and classify it as an ASCII character.         */
/*                                                                          */
/****************************************************************************/ void
process_contour(contour, word, page, pw)

register CONTOUR *contour;
WORD *word;
PAGE *page;
Pixwin *pw;

{
/*
    if (contour->feature.area > AREA_THRESHOLD)
      yuri_features(contour, pw);
*/
    if (contour->hole_count == 1)
      calculate_hole_features(contour,&page->contours[contour->holes[0]]);
    initialize_global_variables();
    generate_grid_lines( contour );
    traverse_contour( contour, pw);
/*    plot_contour_bounding_box(contour, pw); */
    if (is_touching_character(contour,page) == TRUE)
    {
/*     pw_text(pw, contour->feature.box.x0,
               contour->feature.box.y0 + contour->feature.box.height + 10,
               PIX_SRC, 0, "TOUCH");
*/
      classification = '*';
    }
      else
      {
        find_intersection_lengths( contour );
        calculate_angles();
        generate_grid_codes( contour );
        find_local_areas_and_lengths(contour);
        calculate_four_point_subareas();
        assign_feature_vector(contour);
        classify_contour(contour, word);
      }
}

/****************************************************************************/
/*                                                                          */
/*  process_word                                                            */
/*  ===========                                                             */
/*                                                                          */
/****************************************************************************/ void
process_word( word, page, pw)
```

```
WORD *word;
PAGE *page;
Pixwin *pw;

{
  CONTOUR *contour;
  LETTER *letter;
  int num_numeric, num_upper_case;
  int num_ambiguous, num_non_ambiguous;
  int letter_num;
  float upper_case_ratio;
  char class[2];

class[1] = '\0';
  num_numeric = 0;
  num_upper_case = 0;
  num_ambiguous = 0;
  letter = word->letters;
  for (letter_num = 0; letter_num < word->num_letters; letter_num++)
  {
    contour = letter->contour;
    process_contour( contour, word, page, pw );
    letter->label = classification;

if (is_ambiguous(letter->label))
    {
      num_ambiguous++;
      letter->ambiguous = TRUE;
    }
      else
      {
        letter->char_type = determine_char_type(letter->label);
        if (letter->char_type == NUMERIC)
          num_numeric++;
        else
        {
          letter->letter_case = determine_case(letter->label);
          if (letter->letter_case == UPPER)
            num_upper_case++;
        }
      }
    letter = letter->next_letter;
  } if (num_numeric > 0)
    word->char_type = NUMERIC;
    else
    {
      word->char_type = ALPHABETIC;
      if ((word->letters->letter_case == UPPER) &&
          (word->letters->ambiguous == FALSE))
        num_upper_case--;
      if (word->letters->ambiguous == TRUE)
        num_ambiguous--;

num_non_ambiguous = word->num_letters - num_ambiguous - 1;
      if (num_non_ambiguous > 0)
      {
        upper_case_ratio = 1.0 * num_upper_case / num_non_ambiguous;
        if (upper_case_ratio > 0.5)
        {
          word->word_case = UPPER;
          upper_case_correction(word->letters);
        }
```

```
            else word->word_case = LOWER;
        }
    } if ((num_ambiguous > 0) || (word->letters->ambiguous == TRUE))
      ambiguous_correction(word);
/*
  word->word_string = make_string(word);
  spell_check(word->word_string);

letter = word->letters;
  for (letter_num = 0; letter_num < word->num_letters; letter_num++)
  {
    contour = letter->contour;
    class[0] = letter->label;
    pw_text(pw, contour->feature.box.x0,
             contour->feature.box.y0 + contour->feature.box.height + 10,
             PIX_SRC, 0, class);
    letter = letter->next_letter;
  }
*/
  word->word_string = (char *)malloc(32);
  fscanf(ascii_file,"%s",word->word_string);
  pw_text(pw, word->letters->contour->feature.box.x0,
           word->letters->contour->feature.box.y0 +
           word->letters-> contour->feature.box.height + 10,
           PIX_SRC, 0, word->word_string);

}

/***************************************************************************/
/*                                                                         */
/*   process_page                                                          */
/*   ============                                                          */
/*       Calls on process_contour to process only those contours in the    */
/*       page data structure that are TEXT contours (i.e. contours that    */
/*       represent textual characters, not graphical components).          */
/*                                                                         */
/***************************************************************************/ void
process_page( page, number_of_boxes )

PAGE *page;
int number_of_boxes;

{
  WORD *word;
  LETTER *letter;
  BOX_LIST *box_order_list;
  int num_words;
  int num_chars;
  int box, word_num;
  struct dot_list *dot;

int num;
  CONTOUR *contour;

Frame frame;
  Canvas canvas;
  Pixwin *pw;
  struct singlecolor *colormap;
  struct singlecolor *calloc();
```

```c
    colormap = calloc(1,sizeof(struct singlecolor));
    colormap->red = 65;
    colormap->blue = 68;
    colormap->green = 184;
    frame = window_create(NULL, FRAME,
                FRAME_LABEL, "ocrtool",
                FRAME_FOREGROUND_COLOR, colormap,
                0);
    canvas = window_create(frame, CANVAS,
                CANVAS_AUTO_SHRINK,     FALSE,
                CANVAS_WIDTH,           4000,
                CANVAS_HEIGHT,          4000,
                WIN_VERTICAL_SCROLLBAR, scrollbar_create(0),
                WIN_HORIZONTAL_SCROLLBAR, scrollbar_create(0),
                CANVAS_AUTO_EXPAND,     TRUE,
                0);
    pw = canvas_pixwin(canvas);

/* PLOT BOXES */
/*  for (box = 0; box < number_of_boxes; box++)
      plot_row_box(boxes[box], pw); */

/* PLOT DOTS */
    dot = dots;
    while (dot != NULL)
    {
     traverse_contour(dot->contour, pw);
     dot = dot->next;
    } box_order_list = sort_boxes(number_of_boxes);
    num_words = segment_words(pw, page, number_of_boxes, box_order_list);

num_chars = 0;
    printf("\n");
    word = words;
    for (word_num = 0; word_num < num_words; word_num++)
    {
      process_word(word,page,pw);
      num_chars += word->num_letters + 1;
/*
      if (num_chars > 70)
      {
        printf("\n");
        num_chars = word->num_letters;
      }
      printf("%s ",word->word_string);
*/
    } for(num=0;numcount;num++)
    {
      if ((iec_contour[num].status == 'G') ||
          (iec_contour[num].status == 'g') ||
          (iec_contour[num].status == 'L'))
      {
        contour = &page->contours[num];
        plot_contour(contour,pw);
      }

} window_main_loop(frame);
}
```

```c
#include <stdio.h>
#include <math.h>
#include "ocrdefs.h"
include "ocr_global_vars.h"

/******************************************************************/
/*                                                                */
/* calculate_hole_features                                        */
/* =======================                                        */
/*                                                                */
/******************************************************************/ void
calculate_hole_features( outer_contour, inner_contour )

CONTOUR *outer_contour, *inner_contour;

{ upper_delta_y = abs(outer_contour->feature.box.y0
                     - inner_contour->feature.box.y0);
   lower_delta_y = abs(outer_contour->feature.box.y0
                     + outer_contour->feature.box.height
                     - inner_contour->feature.box.y0
                     - inner_contour->feature.box.height);
}

/******************************************************************/
/*                                                                */
/* generate_grid_lines                                             */
/* ==================                                             */
/*                                                                */
/******************************************************************/ void
generate_grid_lines( contour )

CONTOUR *contour;

{
  int line, left, top;

left = contour->feature.box.x0;
  top  = contour->feature.box.y0;

for( line = 0; line <= 2; line++
  {
    vertical_line[line]   = left + 0.0001 +
                            ((line+1)*1.0*contour->feature.box.width)/4.0);
    horizontal_line[line] = top  + 0.0001 +
                            ((line+1)*1.0*contour->feature.box.height)/4.0);
  }
}

/******************************************************************/
/*                                                                */
/* find_intersection_points                                       */
/* ========================                                       */
/*                                                                */
/******************************************************************/ void
find_intersection_points( x1, y1, x2, y2, current_segment )
```

```
  register int x1, y1, x2, y2;
  int current_segment;

{
  register int line;
  float x_intersection, y_intersection;

for(line = 0; line <= 2; line++)
  {
    x_intersection = find_x_inter(x1, y1, x2, y2, horizontal_line[line]);
    y_intersection = find_y_inter(x1, y1, x2, y2, vertical_line[line]);

if (x_intersection != 0.0)
    {
      if (x_min[line] > x_intersection)
      {
        x_min[line] = x_intersection;
        if (line == MIDDLE)
          segment[LEFT_SEGMENT] = current_segment;
      }
      if (x_max[line] < x_intersection)
      {
        x_max[line] = x_intersection;
        if (line == MIDDLE)
          segment[RIGHT_SEGMENT] = current_segment;
      }
    } if (y_intersection != 0.0)
    {
      if (y_min[line] > y_intersection)
      {
        y_min[line] = y_intersection;
        if (line == MIDDLE)
          segment[TOP_SEGMENT] = current_segment;
      }
      if (y_max[line] < y_intersection)
      {
        y_max[line] = y_intersection;
        if (line == MIDDLE)
          segment[BOTTOM_SEGMENT] = current_segment;
      }
    }
  }
}

/****************************************************************************/
/*                                                                          */
/*  find_intersection_lengths                                               */
/*  ========================                                                */
/*                                                                          */
/****************************************************************************/ void
find_intersection_lengths( contour )

CONTOUR *contour;

{
  register int line;

for( line = 0; line <= 2; line++ )
  {
```

```c
      x_int[HORIZONTAL][line][LEFT] = x_min[line];
      x_int[HORIZONTAL][line][RIGHT] = x_max[line];
      x_int[VERTICAL][TOP][line] = vertical_line[line];
      x_int[VERTICAL][BOTTOM][line] = vertical_line[line];

y_int[VERTICAL][TOP][line] = y_min[line];
      y_int[VERTICAL][BOTTOM][line] = y_max[line];
      y_int[HORIZONTAL][line][LEFT] = horizontal_line[line];
      y_int[HORIZONTAL][line][RIGHT] = horizontal_line[line];

horizontal_int_length[line] = fabs(x_int[HORIZONTAL][line][RIGHT] -
                                         x_int[HORIZONTAL][line][LEFT]) /
                                        (1.0*contour->feature.box.width);
      vertical_int_length[line] = fabs(y_int[VERTICAL][BOTTOM][line] -
                                       y_int[VERTICAL][TOP][line]) /
                                      (1.0*contour->feature.box.height);
   }
}

/****************************************************************************/
/*                                                                          */
/*  generate_grid_codes                                                     */
/*  ===================                                                    */
/*                                                                          */
/****************************************************************************/ void
generate_grid_codes( contour )

CONTOUR *contour;

{
   float x_one_third, y_one_third;
   float dx, dy;
   register int line;

x_one_third = 1.0*contour->feature.box.width / 3.0;
   y_one_third = 1.0*contour->feature.box.height / 3.0;

for( line = 0; line <= 2; line++ )
   {
      x_mid[line] = (x_int[HORIZONTAL][line][LEFT]
                   + x_int[HORIZONTAL][line][RIGHT]) / 2.0;
      dx = x_mid[line] - 1.0*contour->feature.box.x0;
      if (dx < x_one_third)
         H_array[line][LEFT] = TRUE;
         else
            if ((dx < (2*x_one_third)) && (dx >= x_one_third))
               H_array[line][MIDDLE] = TRUE;
               else H_array[line][RIGHT] = TRUE;

y_mid[line] = (y_int[VERTICAL][TOP][line]
                   + y_int[VERTICAL][BOTTOM][line]) /2.0;
      dy = y_mid[line] - 1.0*contour->feature.box.y0;
      if (dy < y_one_third)
         V_array[TOP][line] = TRUE;
         else
            if ((dy < (2.0*y_one_third)) && (dy >= y_one_third))
               V_array[MIDDLE][line] = TRUE;
               else V_array[BOTTOM][line] = TRUE;
   }
}
```

```
/***************************************************************/
/*                                                             */
/*   calculate_angles                                          */
/*   =================                                         */
/*                                                             */
/***************************************************************/ void
calculate_angles()

{
   angle[TOP_TO_RIGHT] = calc_angle(x_int[VERTICAL][TOP][MIDDLE],
                                    y_int[VERTICAL][TOP][MIDDLE],
                                    x_int[HORIZONTAL][MIDDLE][RIGHT],
                                    y_int[HORIZONTAL][MIDDLE][RIGHT]);

angle[RIGHT_TO_BOTTOM] = calc_angle(x_int[HORIZONTAL][MIDDLE][RIGHT],
                                       y_int[HORIZONTAL][MIDDLE][RIGHT],
                                       x_int[VERTICAL][BOTTOM][MIDDLE],
                                       y_int[VERTICAL][BOTTOM][MIDDLE]);

angle[BOTTOM_TO_LEFT] = calc_angle(x_int[VERTICAL][BOTTOM][MIDDLE],
                                      y_int[VERTICAL][BOTTOM][MIDDLE],
                                      x_int[HORIZONTAL][MIDDLE][LEFT],
                                      y_int[HORIZONTAL][MIDDLE][LEFT]);

angle[LEFT_TO_TOP] = calc_angle(x_int[HORIZONTAL][MIDDLE][LEFT],
                                   y_int[HORIZONTAL][MIDDLE][LEFT],
                                   x_int[VERTICAL][TOP][MIDDLE],
                                   y_int[VERTICAL][TOP][MIDDLE]);
}

/***************************************************************/
/*                                                             */
/*   find_local_areas_and_lengths                              */
/*   ===========================                               */
/*                                                             */
/***************************************************************/ void
find_local_areas_and_lengths( contour )

register CONTOUR *contour;

{
   int num_segments, current_segment;
   int start_segment, end_segment;
   register int local_region;
   register int p1, p2;
   float xstart, ystart, xend, yend;

float segment_length, local_area;

for( local_region=TOP_TO_RIGHT; local_region<=LEFT_TO_TOP; local_region++)
{
   switch (local_region)
   {
       case TOP_TO_RIGHT       : start_segment = TOP_SEGMENT;
                                 end_segment = RIGHT_SEGMENT;
                                 xstart = x_int[VERTICAL][TOP][MIDDLE];
                                 ystart = y_int[VERTICAL][TOP][MIDDLE];
                                 xend = x_int[HORIZONTAL][MIDDLE][RIGHT];
                                 yend = y_int[HORIZONTAL][MIDDLE][RIGHT];
                                 break;
```

```
        case RIGHT_TO_BOTTOM     : start_segment = RIGHT_SEGMENT;
                                   end_segment = BOTTOM_SEGMENT;
                                   xstart = x_int[HORIZONTAL][MIDDLE][RIGHT];
                                   ystart = y_int[HORIZONTAL][MIDDLE][RIGHT];
                                   xend = x_int[VERTICAL][BOTTOM][MIDDLE];
                                   yend = y_int[VERTICAL][BOTTOM][MIDDLE];
                                   break;
        case BOTTOM_TO_LEFT      : start_segment = BOTTOM_SEGMENT;
                                   end_segment = LEFT_SEGMENT;
                                   xstart = x_int[VERTICAL][BOTTOM][MIDDLE];
                                   ystart = y_int[VERTICAL][BOTTOM][MIDDLE];
                                   xend = x_int[HORIZONTAL][MIDDLE][LEFT];
                                   yend = y_int[HORIZONTAL][MIDDLE][LEFT];
                                   break;
        case LEFT_TO_TOP         : start_segment = LEFT_SEGMENT;
                                   end_segment = TOP_SEGMENT;
                                   xstart = x_int[HORIZONTAL][MIDDLE][LEFT];
                                   ystart = y_int[HORIZONTAL][MIDDLE][LEFT];
                                   xend = x_int[VERTICAL][TOP][MIDDLE];
                                   yend = y_int[VERTICAL][TOP][MIDDLE];
                                   break;
} if (segment[end_segment] > segment[start_segment])
   num_segments = segment[end_segment] - segment[start_segment];
   else num_segments = segment[end_segment]
                     + contour->vector_count
                     - segment[start_segment];

length[local_region] = 0.0;
area[local_region] = 0.0;

for( current_segment=1; current_segment<=num_segments; current_segment++)
{
  p1 = segment[start_segment] + current_segment;
  if (p1 < contour->vector_count)
     p2 = p1 + 1;
     else
        if (p1 == contour->vector_count)
           p2 = 1;
           else
              if (p1 > contour->vector_count)
              {
                 p1 = p1 - contour->vector_count;
                 p2 = p1 + 1;
              }
    if (current_segment == 1)
    {
       segment_length = distance( xstart, ystart, 1.0*cx[p1], 1.0*cy[p1] );
       local_area = cross_product(xstart,ystart,1.0*cx[p1],1.0*cy[p1],
                                 1.0*cx[p2],1.0*cy[p2]);
    }
       else
          if ((current_segment > 1) && (current_segment < num_segments))
          {
             segment_length = distance( 1.0*cx[p1], 1.0*cy[p1],
                                       1.0*cx[p2], 1.0*cy[p2] );
             local_area = cross_product(xstart,ystart,1.0*cx[p1],1.0*cy[p1],
                                       1.0*cx[p2],1.0*cy[p2]);
          }
             else
             {
```

```
            segment_length = distance( 1.0*cx[p1],1.0*cy[p1], xend, yend );
            local_area = cross_product(xstart,ystart,1.0*cx[p1],1.0*cy[p1],
                                       xend,yend);
         } if (current_segment < num_segments)
         local_area = cross_product(xstart,ystart,1.0*cx[p1],1.0*cy[p1],
                                    1.0*cx[p2],1.0*cy[p2]);
      else local_area = cross_product(xstart,ystart,1.0*cx[p1],1.0*cy[p1],
                                      xend,yend);

length[local_region] = length[local_region] + segment_length;
      area[local_region] = area[local_region] + local_area;
      } length[local_region] = length[local_region] / perimeter;
      area[local_region] = area[local_region] / (2.0 * contour->feature.area);
      contour->feature.local_area[local_region] = area[local_region];
      contour->feature.local_length[local_region] = length[local_region];
   }
}
/*****************************************************************/
/*                                                               */
/* calculate_four_point_subareas                                 */
/* ===============================                               */
/*                                                               */
/*****************************************************************/ void
calculate_four_point_subareas()

{
   four_point_subarea[0] = cross_product(x_int[VERTICAL][TOP][MIDDLE],
                                         y_int[VERTICAL][TOP][MIDDLE],
                                         x_int[HORIZONTAL][MIDDLE][RIGHT],
                                         y_int[HORIZONTAL][MIDDLE][RIGHT],
                                         x_int[VERTICAL][BOTTOM][MIDDLE],
                                         y_int[VERTICAL][BOTTOM][MIDDLE]) / 2.0;

four_point_subarea[1] = cross_product(x_int[HORIZONTAL][MIDDLE][RIGHT],
                                         y_int[HORIZONTAL][MIDDLE][RIGHT],
                                         x_int[VERTICAL][BOTTOM][MIDDLE],
                                         y_int[VERTICAL][BOTTOM][MIDDLE],
                                         x_int[HORIZONTAL][MIDDLE][LEFT],
                                         y_int[HORIZONTAL][MIDDLE][LEFT]) / 2.0;

four_point_subarea[2] = cross_product(x_int[VERTICAL][BOTTOM][MIDDLE],
                                         y_int[VERTICAL][BOTTOM][MIDDLE],
                                         x_int[HORIZONTAL][MIDDLE][LEFT],
                                         y_int[HORIZONTAL][MIDDLE][LEFT],
                                         x_int[VERTICAL][TOP][MIDDLE],
                                         y_int[VERTICAL][TOP][MIDDLE]) / 2.0;

four_point_subarea[3] = cross_product(x_int[HORIZONTAL][MIDDLE][LEFT],
                                         y_int[HORIZONTAL][MIDDLE][LEFT],
                                         x_int[VERTICAL][TOP][MIDDLE],
                                         y_int[VERTICAL][TOP][MIDDLE],
                                         x_int[HORIZONTAL][MIDDLE][RIGHT],
                                         y_int[HORIZONTAL][MIDDLE][RIGHT]) / 2.
}
```

```
/****************************************************************/
/*                                                              */
/*   assign_feature_vector                                      */
/*   =====================                                      */
/*                                                              */
/****************************************************************/ void
assign_feature_vector( contour )

CONTOUR *contour;

{
  float contour_area, contour_bounding_box_area, contour_aspect_ratio;
  float four_point_area, four_point_bounding_box_area, four_point_aspect_rat float four_point_x_min, four_point_x_max;
  float four_point_y_min, four_point_y_max;

register int region, line, feature;

four_point_x_min = min(x_int[VERTICAL][TOP][MIDDLE],
                         x_int[HORIZONTAL][MIDDLE][RIGHT],
                         x_int[VERTICAL][BOTTOM][MIDDLE],
                         x_int[HORIZONTAL][MIDDLE][LEFT]);

four_point_x_max = max(x_int[VERTICAL][TOP][MIDDLE],
                         x_int[HORIZONTAL][MIDDLE][RIGHT],
                         x_int[VERTICAL][BOTTOM][MIDDLE],
                         x_int[HORIZONTAL][MIDDLE][LEFT]);

four_point_y_min = min(y_int[VERTICAL][TOP][MIDDLE],
                         y_int[HORIZONTAL][MIDDLE][RIGHT],
                         y_int[VERTICAL][BOTTOM][MIDDLE],
                         y_int[HORIZONTAL][MIDDLE][LEFT]);

four_point_y_max = max(y_int[VERTICAL][TOP][MIDDLE],
                         y_int[HORIZONTAL][MIDDLE][RIGHT],
                         y_int[VERTICAL][BOTTOM][MIDDLE],
                         y_int[HORIZONTAL][MIDDLE][LEFT]);

four_point_aspect_ratio = (four_point_y_max - four_point_y_min) /
                            (four_point_x_max - four_point_x_min);

four_point_bounding_box_area = (four_point_x_max - four_point_x_min) *
                                 (four_point_y_max - four_point_y_min);

four_point_area = four_point_subarea[0] + four_point_subarea[2];

contour_aspect_ratio = (1.0*contour->feature.box.height) /
                         (1.0*contour->feature.box.width);

contour_bounding_box_area = 1.0*(contour->feature.box.height *
                                   contour->feature.box.width);

contour_area = contour->feature.area;

for( region = TOP_TO_RIGHT; region <= LEFT_TO_TOP; region++)
  {
    feature_vector[region] = area[region];
    feature_vector[region+12] = length[region];
    feature_vector[region+16] = angle[region];
  }
```

```
feature_vector[4] = four_point_area / contour_bounding_box_area;
feature_vector[5] = contour_area / contour_bounding_box_area;

for( line = TOP; line <= BOTTOM; line++ )
   feature_vector[line+6] = horizontal_int_length[line];
for( line = LEFT; line <= RIGHT; line++ )
   feature_vector[line+9] = vertical_int_length[line];

for( region = 0; region <= 3; region++ )
   feature_vector[region+20] = four_point_subarea[region] / four_point_area;

feature_vector[24] = four_point_area / contour_area;
feature_vector[25] = contour_aspect_ratio;
feature_vector[26] = four_point_area / four_point_bounding_box_area;
feature_vector[27] = four_point_bounding_box_area / contour_bounding_box_area
feature_vector[28] = four_point_aspect_ratio;

for( feature = 0; feature < NumFeatures; feature++ )
   int_feature_vector[feature] = 1000 * feature_vector[feature];
}

/******************************************************************/ wdth_max :=0;
        hght_max :=0;
        sum_height :=0;

for i :=1 to NOC do begin
          c_boxs[i]^.i_holes :=0;
          c_boxs[i]^.o_holes :=0;
        end;
        for i :=1 to NUC do begin
          u_boxs[i]^.i_holes :=0;
          u_boxs[i]^.o_holes :=0;
        end;

for i :=1 to NOB do
          begin
            row_mean_area[i] :=0;
            row_mean_width[i] :=0;
            row_mean_height[i] :=0;
            in_area_ratio[i] :=0;
            u_ptr_str[i] :=0;
            u_ptr_end[i] :=0;
          end;

for i :=1 to NOB do
          for j :=1 to NOE do begin
            local_mean_h[i]^[j] :=0;
            local_mean_a[i]^[j] :=0;
            local_mean_w[i]^[j] :=0;
            new_local_mean_h[i]^[j] :=0;
            new_local_mean_w[i]^[j] :=0;
          end;

repeat dat_input;
          com_analysis;
          com_save;

until Eof(f1);
```

```
        est_chr_size :=round(sum_height/c_count);
        writeln(' ****** est_char_height= ', est_chr_size,' ******');

writeln(' **** The end of file reading *** ');

{ row segmentation of outer contour components } i :=1;
        index :=1;
        y_ptr[1] :=1;
        element_count :=0;
        y_max :=0;
        h_max :=0;

while i<=t_com-1 do
      begin
         if c_boxs[i]^.height>h_max then h_max :=c_boxs[i]^.height;
         if c_boxs[i]^.max_y>y_max then y_max :=c_boxs[i]^.max_y;
    delty1 :=c_boxs[i+1]^.min_y-y_max;
         if (c_boxs[i]^.xy_ratio>0.8) and (c_boxs[i]^.xy_ratio<3) then
    begin        element_count :=element_count+1;
                   row_mean_area[index]
    :=row_mean_area[index]+c_boxs[i]^.r_area;
    row_mean_width[index] :=row_mean_width[index]+c_boxs[i]^.width;
             row_mean_height[index]
    :=row_mean_height[index]+c_boxs[i]^.height;         end;
        if (delty1>0) or (i=t_com-1) then
           begin
              row_hmax[index] :=h_max;
              y_max :=0;
              h_max :=0;
              if element_count<>0 then begin
                        row_mean_area[index]
    :=row_mean_area[index]/element_count;
    row_mean_width[index] :=row_mean_width[index]/element_count;
            row_mean_height[index]:=row_mean_height[index]/element_count;
               end else begin
                  row_mean_area[index] :=row_mean_area[index-1];
                  row_mean_width[index] :=row_mean_width[index-1];
                  row_mean_height[index] :=row_mean_height[index-1];
        end;
             if i<>t_com-1 then begin
                element_count :=0;
                index :=index+1;
                y_ptr[index] :=i+1;
             end else begin
                element_count :=0;
                index :=index+1;
                y_ptr[index] :=t_com+1;
             end;
           end;
        i :=i+1;
    end;

t_line :=index;

writeln('y_ptr1=',y_ptr[index-1],' y_ptr2=',y_ptr[index]);

writeln(' *** the end of the outer contours row segmentation ***
');
```

```
            if t_com>=NOC then
            begin
102:        writeln('***  t_com>',NOC,'   ****');
            goto 102;
            end;

if u_com>=NUC then
            begin
103:        writeln('***  u_com>',NUC,'   ***** ');
            goto 103;
            end;

if g_com>=NGC then
            begin
104:        writeln('***  g_com>',NGC,'   ***** ');
            goto 104;
            end;

if t_line>=NOB then
            begin
101:        writeln('***  t_line>= ',NOB,' *** ');
            goto 101;
            end;

{ row segmentation of the inner contour components } ku :=1;
    u_index :=0;
    str_count :=0;
    yrev :=0;
    nrev :=0;
        for i :=1 to NOB do bitrev[i] :=false;
        for i :=1 to index-1 do begin
            find_min_max(i,bymin[i],bymax[i]);
            yrev :=0;
            nrev :=0;
            while ku<=u_com do
                begin
                    with u_boxs[ku]^ do
{                       writeln(' ku=',ku,' area_rt=',area_rt:8:5,'
min_y=',min_y,'   max_y=',max_y);}                        if
((u_boxs[ku]^.min_y>=bymin[i]) and
              (u_boxs[ku]^.max_y<=bymax[i])) or
             ((u_boxs[ku]^.area_rt<0.85) and
              (u_boxs[ku]^.height>bymax[i]-bymin[i]) and
              (u_boxs[ku]^.min_y<bymin[i])     and
(u_boxs[ku]^.max_y>bymax[i]))                     then begin
                 if (u_boxs[ku]^.area_rt<0.85) and
                    (u_boxs[ku]^.height>bymax[i]-bymin[i])
and              (u_boxs[ku]^.min_y<bymin[i]) and
(u_boxs[ku]^.max_y>bymax[i])
                       then begin
                           bitrev[i] :=true;
                           yrev :=yrev+1;
                        end
                    else nrev :=nrev+1;
                 {writeln('i=',i,'    yrev=',yrev,'
nrev=',nrev);}                 if u_boxs[ku]^.status='u'
then
                    begin
                       str_count :=str_count+1;
```

```
                    if str_count=1 then begin
                            u_index :=i;
                            u_ptr_str[u_index]:=ku;
                        end;
                    end;
                    ku :=ku+1;
                end
            else if ((u_boxs[ku]^.min_y<=bymin[i]) and
                (u_boxs[ku]^.max_y>=bymin[i])) or
            ((u_boxs[ku]^.min_y<=bymax[i]) and
            (u_boxs[ku]^.max_y>=bymax[i])) or
((u_boxs[ku]^.min_y<=bymin[i]) and
(u_boxs[ku]^.max_y>=bymax[i]))
                    then
                    begin
                        if u_boxs[ku]^.status='u' then
                            u_boxs[ku]^.status :='G';
                        ku :=ku+1;
                    end
                else begin
                    if str_count=0 then begin
                                                                    if
u_boxs[ku]^.max_y<=bymin[i]
        then
                                            begin
                                                                    if
u_boxs[ku]^.status='u' then                  .                         ,
            u_boxs[ku]^.status :='G';
                ku :=ku+1;
                                        goto 9;
                                    end else
                                                                    if
u_boxs[ku]^.min_y>=bymax[i] then
                goto 10;
                            end else begin
                                u_ptr_end[u_index] :=ku-1;
                                if yrev>nrev then bitrev[i] :=true
                                        else bitrev[i] :=false;
                            writeln(' i=',i,' bitrev=',bitrev[i]);
                            if bitrev[i]=true then
                                    for k :=u_ptr_str[i] to u_ptr_end[i]
do                                          if u_boxs[k]^.status='G' then
                                        u_boxs[k]^.status :='g';
                                str_count :=0;
                                goto 10;
                            end;
                    end;
9:          end;
10:     end;

u_ptr_end[u_index] :=ku-1;

writeln(' *** the end of the inner contours row segmentation ***
');

for i :=1 to t_line do begin
   c_str[i] :=c_boxs[y_ptr[i]]^.c_order;
   if u_ptr_end[i]>0 then c_end[i] :=u_boxs[u_ptr_end[i]]^.c_order
                    else c_end[i] :=c_boxs[y_ptr[i+1]-1]^.c_order;
end;

{ save the file }
```

```
t_line :=t_line-1;
write(f5,t_line);
for i :=1 to t_line do begin
   write(f5,bymin[i],bymax[i],c_str[i],c_end[i]);
   writeln(' i=',i,' c_str=',c_str[i],' c_end=',c_end[i]);
end;

{ Sorting the outer contours in horizontal direction } for index :=1 to t_line do
   quick(y_ptr[index],y_ptr[index+1]-1);

{ Grouping outer contour components } lc_count :=0;
   local_area_max :=0;
   local_hght_max :=0;
   local_wdth_max :=0;

for i :=1 to t_line do begin
   j :=y_ptr[i];
   x_ptr[i,1] :=y_ptr[i];
   c_index :=1;
   while j<=y_ptr[i+1]-1 do begin
      p2 :=c_boxs[j+1]^.c_index;
      p1 :=c_boxs[j]^.c_index;
      if (c_boxs[p1]^.xy_ratio>0.8) and (c_boxs[p1]^.xy_ratio<3) then
   begin
         local_mean_h[i]^[c_index]
:=local_mean_h[i]^[c_index]+c_boxs[p1]^.height;
         local_mean_a[i]^[c_index]
:=local_mean_a[i]^[c_index]+c_boxs[p1]^.r_area;
         local_mean_w[i]^[c_index]
:=local_mean_w[i]^[c_index]+c_boxs[p1]^.width;                    lc_count
:=lc_count+1;
      end;

deltx :=c_boxs[p2]^.min_x-c_boxs[p1]^.max_x;
      if (deltx>2*row_mean_width[i]) or
         (j=y_ptr[i+1]-1) then
        begin
           if lc_count<>0 then begin
              local_mean_h[i]^[c_index]
:=round(local_mean_h[i]^[c_index]/lc_count);
              local_mean_w[i]^[c_index]
:=round(local_mean_w[i]^[c_index]/lc_count);

local_mean_a[i]^[c_index] :=local_mean_a[i]^[c_index]/lc_count;
         if local_mean_a[i]^[c_index]>local_area_max then
            local_area_max :=local_mean_a[i]^[c_index];
           if local_mean_h[i]^[c_index]>local_hght_max then
              local_hght_max :=local_mean_h[i]^[c_index];
           if local_mean_w[i]^[c_index]>local_wdth_max then
              local_wdth_max :=local_mean_w[i]^[c_index];
         end else begin
            local_mean_h[i]^[c_index]:=local_mean_h[i]^[c_index-1];
            local_mean_w[i]^[c_index] :=local_mean_w[i]^[c_index-1];
            local_mean_a[i]^[c_index] :=local_mean_a[i]^[c_index-1];
         end;
         if j<>y_ptr[i+1]-1 then
           begin
              c_index :=c_index+1;
              lc_count :=0;
```

```
            x_ptr[i,c_index] :=j+1;
         end else
         begin
            c_index :=c_index+1;
            lc_count :=0;
            x_ptr[i,c_index] :=y_ptr[i+1];
         end;
      end;
      j :=j+1;
   end;
   num_seg[i] :=c_index;
end;

{ Matching the inner components and the outer components } for i_index :=1 to u_index do begin
   writeln('i=',i_index, ' k_matching=',k1);
   if   (u_ptr_end[i_index]>=u_ptr_str[i_index])   and
(u_ptr_str[i_index]<>0) then   for i_com :=u_ptr_str[i_index] to
u_ptr_end[i_index] do begin       out_to_in :=false;
      in_to_out :=false;
      if u_boxs[i_com]^.status='u' then begin
         u_left :=u_boxs[i_com]^.min_x;
         u_right :=u_boxs[i_com]^.max_x;
         u_top :=u_boxs[i_com]^.min_y;
         u_btm :=u_boxs[i_com]^.max_y;
         k1 :=y_ptr[i_index];
         while k1<=y_ptr[i_index+1]-1 do begin
            x_left :=c_boxs[k1]^.min_x;
            x_right :=c_boxs[k1]^.max_x;
            y_top :=c_boxs[k1]^.min_y;
            y_btm :=c_boxs[k1]^.max_y;
            if (x_left>=u_left) and (u_right>=x_right)
               and (y_top>=u_top) and (u_btm>=y_btm) then
               begin
                  in_to_out :=true;
                  u_boxs[i_com]^.i_holes:=u_boxs[i_com]^.i_holes+1;
                  c_boxs[k1]^.o_holes :=c_boxs[k1]^.o_holes+1;

i_iu :=u_boxs[i_com]^.i_holes;
                  o_iu :=c_boxs[k1]^.o_holes;
                  u_boxs[i_com]^.fptr[i_iu] :=k1;
                  c_boxs[k1]^.bptr[o_iu] :=i_com;
                  if bitrev[i_index]=true then begin
                     u_boxs[i_com]^.status :='g';
                     c_boxs[k1]^.status :='g';
                  end;
               end;
            if (u_left>=x_left) and (x_right>=u_right)
               and (u_top>=y_top) and (y_btm>=u_btm) then
                  begin
                     out_to_in :=true;
                     c_boxs[k1]^.i_holes :=c_boxs[k1]^.i_holes+1;
            u_boxs[i_com]^.o_holes :=u_boxs[i_com]^.o_holes+1;
            i_ic :=c_boxs[k1]^.i_holes;
                     o_ic :=u_boxs[i_com]^.o_holes;
                     c_boxs[k1]^.fptr[i_ic] :=i_com;
                     u_boxs[i_com]^.bptr[o_ic] :=k1;
                     if bitrev[i_index]=true then begin
                        u_boxs[i_com]^.status :='g';
                        c_boxs[k1]^.status :='g';
                     end;
```

```
                end;
                k1  :=k1+1;
             end;{ The end of while loop }
             if (out_to_in=false) and (in_to_out=false) then
                if bitrev[i_index]=true then u_boxs[i_com]^.status :='g'
                                        else u_boxs[i_com]^.status :='G';
          end; { The end of if loop }
       end;
       if bitrev[i_index]=true then
          writeln('******* found bit_reversed texts ********' ); end;
writeln('** End of inner and outer matching **');

for i :=1 to t_line do begin
   for j :=1 to num_seg[i]-1 do begin
     sum_count :=0;
     sum_area_rt :=0;
     art_char :=0;
     find_graphics :=false;
     num_com :=x_ptr[i,j+1]-1-x_ptr[i,j];
     for k:=x_ptr[i,j] to x_ptr[i,j+1]-1 do begin
       p1 :=c_boxs[k]^.c_index;
       if c_boxs[p1]^.o_holes=0 then begin
{         if c_boxs[p1]^.i_holes=0 then
             if (c_boxs[p1]^.r_area>3*local_mean_a[i]^[j])
                and (c_boxs[p1]^.width>2*local_mean_w[i]^[j])
                and (c_boxs[p1]^.xy_ratio>0.8)
                and (c_boxs[p1]^.xy_ratio<2.0)
                then c_boxs[p1]^.status :='g';} if c_boxs[p1]^.i_holes=1 then begin
             p11 :=c_boxs[p1]^.fptr[1];

if   (u_boxs[p11]^.i_holes>0)   and
(u_boxs[p11]^.area_rt<0.9) then begin                    art_char
:=art_char+1;
                    writeln('  *** artistic characters found *** ',
art_char);          end else begin
             if ((u_boxs[p11]^.area_rt>0.87)
                and (c_boxs[p1]^.area_rt>0.87)
                and (c_boxs[p1]^.xy_ratio>0.90)
                and (c_boxs[p1]^.xy_ratio<1.10)
                and (u_boxs[p11]^.xy_ratio>0.90)
                and (u_boxs[p11]^.xy_ratio<1.10))
                or ((u_boxs[p11]^.area_rt>0.85)
                and (c_boxs[p1]^.area_rt>0.85)
                and (c_boxs[p1]^.xy_ratio<0.90)
                and (u_boxs[p11]^.xy_ratio<0.90))
                or ((u_boxs[p11]^.area_rt>0.90)
                and (c_boxs[p1]^.area_rt>0.90))
                then begin
                     c_boxs[p1]^.status :='s';
                     u_boxs[p11]^.status :='s';
                end;
          end;
       end;

if c_boxs[p1]^.height>2*est_chr_size then begin
          if (c_boxs[p1]^.i_holes>=2) and (i>=4) then
             begin
                   r1 :=c_boxs[p1]^.area_rt;
                   ar1 :=c_boxs[p1]^.r_area;
```

```
                    ar2 :=0;
                    br2 :=0;
                    r2  :=0;
          if i=29 then writeln(' outer    area=',ar1:8:3,' ratio=',r1);
                    b_count :=0;
                    for k1 :=1 to c_boxs[p1]^.i_holes do
                                                                    if
     (u_boxs[c_boxs[p1]^.fptr[k1]]^.width>1.5*est_chr_size)
         or (u_boxs[c_boxs[p1]^.fptr[k1]]^.height>1.5*est_chr_size)
                    then begin
                                                                   r 2
:=r2+u_boxs[c_boxs[p1]^.fptr[k1]]^.area_rt;
   ar2  :=ar2+abs(u_boxs[c_boxs[p1]^.fptr[k1]]^.r_area);
              br2  :=br2+u_boxs[c_boxs[p1]^.fptr[k1]]^.b_area;
                    b_count :=b_count+1;
                         end;
                  writeln('i=',i,' **** b_count=',b_count);
                  if b_count>0 then begin
                              r_ave :=r2/b_count;
                              a_ave :=ar2/b_count;
                                   end;
if i=29 then writeln(' inner   b_area=',br2:8:3,' ratio=',r_ave);
              if    ((r_ave>0.85)    and    (br2>0.75*ar1)     and
(a_ave>est_chr_size))                       or ((r_ave>0.93) and
(a_ave>est_chr_size))                       then begin
                         c_boxs[p1]^.status :='G';
                         for k1 :=1 to c_boxs[p1]^.i_holes do
                                                                   if
     (u_boxs[c_boxs[p1]^.fptr[k1]]^.width>1.5*est_chr_size)
                                                                   or
(u_boxs[c_boxs[p1]^.fptr[k1]]^.height>1.5*est_chr_size)
                    then
                              u_boxs[c_boxs[p1]^.fptr[k1]]^.status
:='G';                   end;
         end;

if (c_boxs[p1]^.i_holes>2) and (c_boxs[p1]^.xy_ratio>0.8)
            and (i<4) then
            begin
              find_graphics :=true;
              c_boxs[p1]^.status :='g';
              n_holes :=c_boxs[p1]^.i_holes;
              for k1 :=1 to n_holes do
                 u_boxs[c_boxs[p1]^.fptr[k1]]^.status :='g';
            end;

end; { The end of >2*est_chr_size } end;{ The end of c_boxs[p1]^.o_holes=0 } if c_boxs[p1]^.o_holes=1 then begin
       { This could be either inner contour of a large graphics
         having text inside or bit-reversed characters }
       if u_boxs[c_boxs[p1]^.bptr[1]]^.status='u' then
         begin
           sum_count :=sum_count+1;
                                                       sum_area_rt
:=sum_area_rt+u_boxs[c_boxs[p1]^.bptr[1]]^.area_rt;          end;
          if u_boxs[c_boxs[p1]^.bptr[1]]^.status='u' then begin
              writeln('row=',i,' ***** leftover switch to -- G -- ****
');         c_boxs[p1]^.status :='G';
        end;
```

```
              end;
           end; { The end of k= loop } if (i<=3) and (find_graphics=true) and (num_com<=3) then
      for k1 :=x_ptr[i,j] to x_ptr[i,j+1]-1 do begin
              p1 :=c_boxs[k1]^.c_index;
              if c_boxs[p1]^.status='t' then
                 begin { p11=0 }
                    p11 :=0;
                    c_boxs[p1]^.status :='g';
                    num_inside_inner :=c_boxs[p1]^.i_holes;
                    num_ouside_inner :=c_boxs[p1]^.o_holes;
                    if num_inside_inner>0 then
                    for k2 :=1 to num_inside_inner do begin
                       p11 :=c_boxs[p1]^.fptr[k2];
                       u_boxs[p11]^.status :='g';
               end;
               if num_ouside_inner>0 then
               for k2 :=1 to num_ouside_inner do begin
                 p11 :=c_boxs[p1]^.bptr[k2];
                 u_boxs[p11]^.status :='g';
               end;
               if p11<>0 then
                 begin
                    num_inside_outer :=u_boxs[p11]^.i_holes;
                    num_ouside_outer :=u_boxs[p11]^.o_holes;
                    if num_inside_outer>0 then
                    for k2 :=1 to num_inside_outer do begin
                       p22 :=u_boxs[p11]^.fptr[k2];
                       if c_boxs[p22]^.status='t' then
                       c_boxs[p22]^.status :='g';
                    end;
                    if num_ouside_outer>0 then
                    for k2 :=1 to num_ouside_outer do begin
                       p22 :=u_boxs[p11]^.bptr[k2];
                       if c_boxs[p22]^.status='t' then
                       c_boxs[p22]^.status :='g';
                    end;
                 end; { The end of p11<>0 }
            end;   { The end of p11=0 }
       end { The end of k1 loop } else if art_char>0 then
      for k1 :=x_ptr[i,j] to x_ptr[i,j+1]-1 do begin
         p1 :=c_boxs[k1]^.c_index;
         if c_boxs[p1]^.status='t' then
            begin { p11=0 }
               p11 :=0;
               c_boxs[p1]^.status :='g';
               num_inside_inner :=c_boxs[p1]^.i_holes;
               num_ouside_inner :=c_boxs[p1]^.o_holes;
               if num_inside_inner>0 then
               for k2 :=1 to num_inside_inner do begin
                 p11 :=c_boxs[p1]^.fptr[k2];
                 u_boxs[p11]^.status :='g';
               end;
               if num_ouside_inner>0 then
               for k2 :=1 to num_ouside_inner do begin
                 p11 :=c_boxs[p1]^.bptr[k2];
                 u_boxs[p11]^.status :='g';
               end;
```

```
          if p11<>0 then
            begin
              num_inside_outer :=u_boxs[p11]^.i_holes;
              num_ouside_outer :=u_boxs[p11]^.o_holes;
              if num_inside_outer>0 then
               for k2 :=1 to num_inside_outer do begin
                  p22 :=u_boxs[p11]^.fptr[k2];
                  if c_boxs[p22]^.status='t' then
                  c_boxs[p22]^.status :='g';
                 end;
                  if num_ouside_outer>0 then
                   for k2 :=1 to num_ouside_outer do begin
                      p22 :=u_boxs[p11]^.bptr[k2];
                      if c_boxs[p22]^.status='t' then
                      c_boxs[p22]^.status :='g';
                     end;
                end; { The end of p11<>0 }
           end;{ The end of p11=0 }
         end { The end of k1 loop } else if sum_count>0 then begin
         ave_area_rt :=sum_area_rt/sum_count;
           {1. Classify the small inner contours of a big graphics to
graphics}         {2. Classify the text-like symbols to graphics}
         {3. Classify the bit reversed text regions to graphics} for k :=x_ptr[i,j] to x_ptr[i,j+1]-1 do begin
           p1 :=c_boxs[k]^.c_index;
           if u_boxs[c_boxs[p1]^.bptr[1]]^.area_rt>0.85 then
     u_boxs[c_boxs[p1]^.bptr[1]]^.status :='G'
           else u_boxs[c_boxs[p1]^.bptr[1]]^.status :='g';

{            if c_boxs[p1]^.o_holes=1 then
           begin
              Classify the bit reversed regions to graphics
              if ave_area_rt<0.85 then begin
                c_boxs[p1]^.status :='g';
                for k1 :=1 to u_boxs[c_boxs[p1]^.fptr[1]]^.i_holes do
begin             p2 :=u_boxs[c_boxs[p1]^.bptr[1]]^.fptr[k1];
                  c_boxs[p2]^.status :='g';
                end;
              end;

Classify the outer contours, which the inner contour
              is graphics, to graphics if u_boxs[c_boxs[p1]^.bptr[1]]^.o_holes>=1 then
             for k1 :=1 to u_boxs[c_boxs[p1]^.bptr[1]]^.o_holes do begin
                p2 :=u_boxs[c_boxs[p1]^.bptr[1]]^.bptr[k1];
                c_boxs[p2]^.status :='g';
               end;
            end;}
         end;
      end; { The end of sum_count>0 }
   end;
end;

writeln('** The end of collecting small graphics **');
{ Reset the  x_pointers for components grouping } for i :=1 to t_line do begin
  k1 :=0;
  for j :=1 to num_seg[i]-1 do begin
```

```
        find_start :=false;
        for k :=x_ptr[i,j] to x_ptr[i,j+1]-1 do begin
          p1 :=c_boxs[k]^.c_index;
          if (c_boxs[p1]^.status='t') and (find_start=false) then
  begin
            find_start :=true;
            k1 :=k1+1;
            nx_ptr_str[i,k1] :=k;
            if x_ptr[i,j]=x_ptr[i,j+1]-1 then nx_ptr_end[i,k1] :=k;
            new_local_mean_h[i]^[k1] :=local_mean_h[i]^[j];
            new_local_mean_w[i]^[k1] :=local_mean_w[i]^[j];
          end else
          if (((c_boxs[p1]^.status='g') or (c_boxs[p1]^.status='s') or
              (c_boxs[p1]^.status='G') ) and (find_start=true))
  or ((k=x_ptr[i,j+1]-1) and (c_boxs[p1]^.status='t')) then
  begin
            find_start :=false;
            if (k=x_ptr[i,j+1]-1) and (c_boxs[p1]^.status='t')
              then nx_ptr_end[i,k1] :=k
                else nx_ptr_end[i,k1] :=k-1;
          end;
        end;
      end;
      new_num_seg[i] :=k1;
end;

count_G :=0;

for i :=1 to t_com do begin
  writeln(f3,c_boxs[i]^.c_order);
  writeln(f3,c_boxs[i]^.status);
  writeln(f3,c_boxs[i]^.min_x);
  writeln(f3,c_boxs[i]^.min_y);
  writeln(f3,c_boxs[i]^.width);
  writeln(f3,c_boxs[i]^.height);
  writeln(f3,c_boxs[i]^.r_area:10:5);
  writeln(f3,c_boxs[i]^.area_rt:10:5);
  writeln(f3,c_boxs[i]^.i_holes);
  if c_boxs[i]^.status='t' then begin
    if (c_boxs[i]^.i_holes>0) and (c_boxs[i]^.i_holes<10) then
  for k :=1 to c_boxs[i]^.i_holes do
        writeln(f3,u_boxs[c_boxs[i]^.fptr[k]]^.c_order);
  end;
  if c_boxs[i]^.status='G' then
    begin
      count_G :=count_G+1;
      with out_Gr[count_G] do begin
        com :=c_boxs[i]^.c_order;
        min_x :=c_boxs[i]^.min_x;
        min_y :=c_boxs[i]^.min_y;
        max_x :=c_boxs[i]^.min_x+c_boxs[i]^.width;
        max_y :=c_boxs[i]^.min_y+c_boxs[i]^.height;
        write(f4,com,min_x,min_y,max_x,max_y);

end;
    end;
  end;

for i :=1 to u_com do begin
      writeln(f3,u_boxs[i]^.c_order);
      writeln(f3,u_boxs[i]^.status);
```

```
    writeln(f3,u_boxs[i]^.min_x);
    writeln(f3,u_boxs[i]^.min_y);
    writeln(f3,u_boxs[i]^.width);
    writeln(f3,u_boxs[i]^.height);
    writeln(f3,u_boxs[i]^.r_area:10:5);
    writeln(f3,u_boxs[i]^.area_rt:10:5);
end;

for i :=1 to g_com do begin
    writeln(f3,g_boxs[i]^.c_order);
    writeln(f3,g_boxs[i]^.status);
    writeln(f3,g_boxs[i]^.min_x);
    writeln(f3,g_boxs[i]^.min_y);
    writeln(f3,g_boxs[i]^.width);
    writeln(f3,g_boxs[i]^.height);
    writeln(f3,g_boxs[i]^.r_area:10:5);
    writeln(f3,g_boxs[i]^.area_rt:10:5);
    if (g_boxs[i]^.status='G') and (g_boxs[i]^.r_area>0) then
begin
        count_G :=count_G+1;
        with out_Gr[count_G] do begin
          com :=g_boxs[i]^.c_order;
          min_x :=g_boxs[i]^.min_x;
          min_y :=g_boxs[i]^.min_y;
          max_x :=g_boxs[i]^.min_x+g_boxs[i]^.width;
          max_y :=g_boxs[i]^.min_y+g_boxs[i]^.height;
          write(f4,com,min_x,min_y,max_x,max_y);
        end;
     end;
end;

for i :=1 to NUC do dispose(u_boxs[i]);
for i :=1 to NGC do dispose(g_boxs[i]);

{ Second-order row segmentation } acc_index :=0;
for i :=1 to t_line do begin
  g_row_box :=0;
  for j :=1 to new_num_seg[i] do begin
    if box_high(i,j)>2*new_local_mean_h[i]^[j] then
      sub_boxs(i,j) else begin
                            g_row_box :=g_row_box+1;
                            s_box(i,j);
                         end;

end;
end;

writeln(' number of boxex=',acc_index);

for i :=1 to acc_index do
     with t_boxs[i] do begin
       pen('1');
       pplot(0,min_y,min_x);
       pplot(1,min_y,min_x+width);
       pplot(1,min_y+height,min_x+width);
       pplot(1,min_y+height,min_x);
       pplot(1,min_y,min_x);
     end;
```

```
    for i :=1 to NOB do dispose(local_mean_a[i]);
    for i :=1 to NOB do dispose(local_mean_h[i]);
    for i :=1 to NOB do dispose(local_mean_w[i]);
    for i :=1 to NOB do dispose(local_bund_h[i]);
    for i :=1 to NOB do dispose(new_local_mean_h[i]);
    for i :=1 to NOB do dispose(new_local_mean_w[i]);
    for i :=1 to NOC do dispose(c_boxs[i]);
dispose(dx);
dispose(dy);
dispose(xb);
dispose(yb);
for i :=1 to 4000 do new(com_id[i]);
for i :=1 to 4000 do com_id[i]^.n_ptr :=0;

reset(f3);

for i :=1 to t_com do
  with c_buf do begin
    readln(f3,c_order);
    readln(f3,status);
    readln(f3,min_x);
    readln(f3,min_y);
    readln(f3,width);
    readln(f3,height);
    readln(f3,r_area);
    readln(f3,area_rt);
    readln(f3,n_ptr);
    if c_buf.status='t' then begin
      if (n_ptr>0) and (n_ptr<10) then
        for j :=1 to n_ptr do
          readln(f3,ptr[j]);
    end;
    com_id[c_order]^.status :=status;
    com_id[c_order]^.min_x  :=min_x;
    com_id[c_order]^.min_y  :=min_y;
    com_id[c_order]^.width  :=width;
    com_id[c_order]^.height :=height;
    com_id[c_order]^.r_area :=r_area;

com_id[c_order]^.area_rt :=area_rt;
    if com_id[c_order]^.status='t' then begin
      com_id[c_order]^.n_ptr :=n_ptr;
      if com_id[c_order]^.n_ptr>0 then
        for k :=1 to com_id[c_order]^.n_ptr do
          com_id[c_order]^.ptr[k] :=ptr[k];
    end;
end;

for i :=1 to u_com do
  with c_buf do begin
    readln(f3,c_order);
    readln(f3,status);
    readln(f3,min_x);
    readln(f3,min_y);
    readln(f3,width);
    readln(f3,height);
    readln(f3,r_area);
    readln(f3,area_rt);
    com_id[c_order]^.status :=status;
    com_id[c_order]^.min_x :=min_x;
    com_id[c_order]^.min_y :=min_y;
```

```
            com_id[c_order]^.width   :=width;
            com_id[c_order]^.height  :=height;
            com_id[c_order]^.r_area  :=r_area;
            com_id[c_order]^.area_rt :=area_rt;
         end;

for i :=1 to g_com do
            with c_buf do begin
               readln(f3,c_order);
               readln(f3,status);
               readln(f3,min_x);
               readln(f3,min_y);
               readln(f3,width);
               readln(f3,height);
               readln(f3,r_area);
               readln(f3,area_rt);
               com_id[c_order]^.status  :=status;
               com_id[c_order]^.min_x   :=min_x;
               com_id[c_order]^.min_y   :=min_y;
               com_id[c_order]^.width   :=width;
               com_id[c_order]^.height  :=height;
               com_id[c_order]^.r_area  :=r_area;
               com_id[c_order]^.area_rt :=area_rt;
            end;

rewrite(f3);

for i :=1 to t_com+u_com+g_com do begin
            writeln(f3,com_id[i]^.status);
            writeln(f3,com_id[i]^.min_x);
            writeln(f3,com_id[i]^.min_y);
            writeln(f3,com_id[i]^.width);
```

What is claimed is:

1. A method for separating touching characters in a binary image having an outer contour bounding an object region, comprising:

(I) detecting the presence of any closed inner contour within said outer contour;

(II) if there is only a single closed inner contour, determining whether the location of the closed inner contour is horizontally offset from the horizontal center of said object region;

(III) if there are only two closed inner contours, determining whether they are horizontally offset from one another;

(III) determining whether there are more than two closed inner contours; and (IV) if any of the foregoing determining steps finds a true condition, locating a separation point for vertically splitting the character image.

2. The method of claim 1 wherein said step IV of locating a separation point comprises:

(a) if there are two or more horizontally offset closed inner contours, locating the separation point halfway between two adjacent closed inner contours;

(b) if there is only one closed inner contour, placing the separation point at a location horizontally displaced from the closed inner contour towards the center of said object region by a distance corresponding to the thickness of a character stroke.

3. The method of claim 1 further comprising:

(V) if the detecting step I fails to detect at least one closed inner contour, superimposing a plurality of spaced horizontal lines across said object region;

(VI) counting the number of intersections of said binary image along each superimposed horizontal line;

(VII) determining whether the intersection count along any one of the superimposed horizontal lines exceeds a threshold;

(VIII) if the count exceeds the threshold, comparing a pattern of the intersection counts for all superimposed horizontal lines in the image with a library if known intersection count patterns of single characters; and (IX) if a match is not found in the comparing step VIII, transmitting a touching character separation flag.

4. The method of claim 1 wherein the detecting step I comprises contour vectorization of the outer and inner contours.

5. The method of claim 3 further comprising a preceding step of creating said library of known intersection count patterns.

6. The method of claim 5 wherein said step of creating said library comprises performing step V and step VI for each of a set of binary images of known single characters and storing an intersection count for each of said superimposed horizontal lines for each one of said images.

7. An optical character recognition processor for separating touching characters in a binary image having an outer contour bounding an object region, comprising:

means for detecting the presence of any closed inner contour within said outer contour;

means for determining for an image containing a solitary closed inner contour whether the location of the closed inner contour is horizontally offset from the horizontal center of said object region;

means for determining for an image containing a pair of closed inner contours whether the closed inner contours are horizontally offset from one another;

means for determining whether there are more than two closed inner contours in said image; and separation means responsive to each of said means for determining for locating a separation point at which to vertically split the character image.

8. The processor of claim 7 wherein said separation means comprise:

means for locating the separation point halfway between two adjacent closed inner contours for an image having at least a pair of horizontally offset closed inner contours; and means for placing the separation point at a location horizontally displaced from the closed inner contour towards the center of said object region by a distance corresponding to the thickness of a character stroke for an image having a solitary closed inner contour.

9. The processor of claim 7 further comprising:

means for superimposing a plurality of spaced horizontal lines across said object region for images having no closed inner contours;

means for counting the number of intersections of said binary image along each superimposed horizontal line;

threshold means for determining whether the intersection count along any one of the superimposed horizontal lines exceeds a threshold;

comparison means responsive to said threshold means for comparing a pattern of the intersection counts for all superimposed horizontal lines in the image with a library of known patterns of intersection counts for single characters.

10. The processor of claim 7 wherein said means for detecting comprise means for performing contour vectorization of the outer and inner contours in said image.

11. The processor of claim 9 wherein said library comprises a memory for storing the output of said means for counting the number of intersections for a set of images of known solitary characters.

* * * * *